Oct. 1, 1940.    J. CAESAR    2,216,685
CONVEYER
Filed Oct. 20, 1938    24 Sheets-Sheet 1

Inventor,
John Caesar,
by Roberts, Cushman & Woodberry.
Attys.

Oct. 1, 1940.    J. CAESAR    2,216,685
CONVEYER
Filed Oct. 20, 1938    24 Sheets-Sheet 2

Inventor,
John Caesar,
by Roberts, Cushman & Woodberry
Attys.

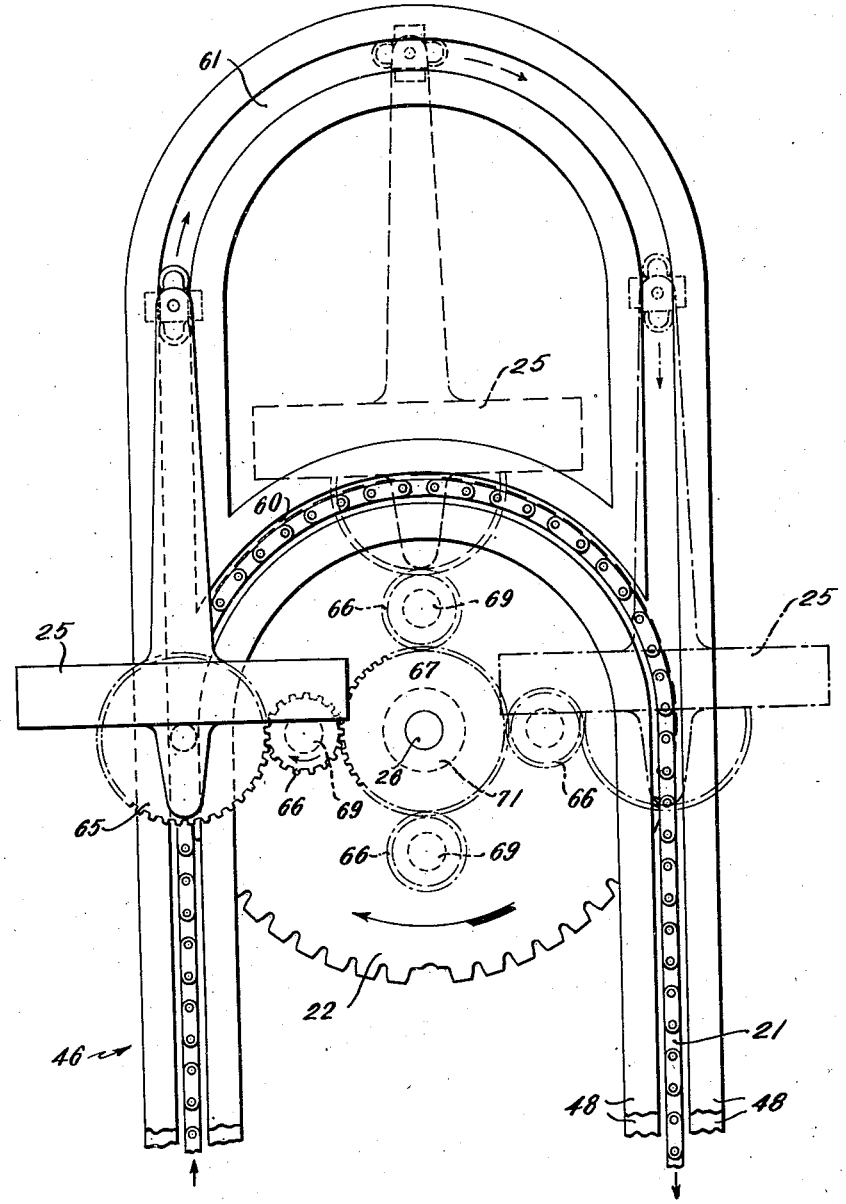

Oct. 1, 1940.  J. CAESAR  2,216,685
CONVEYER
Filed Oct. 20, 1938  24 Sheets-Sheet 4
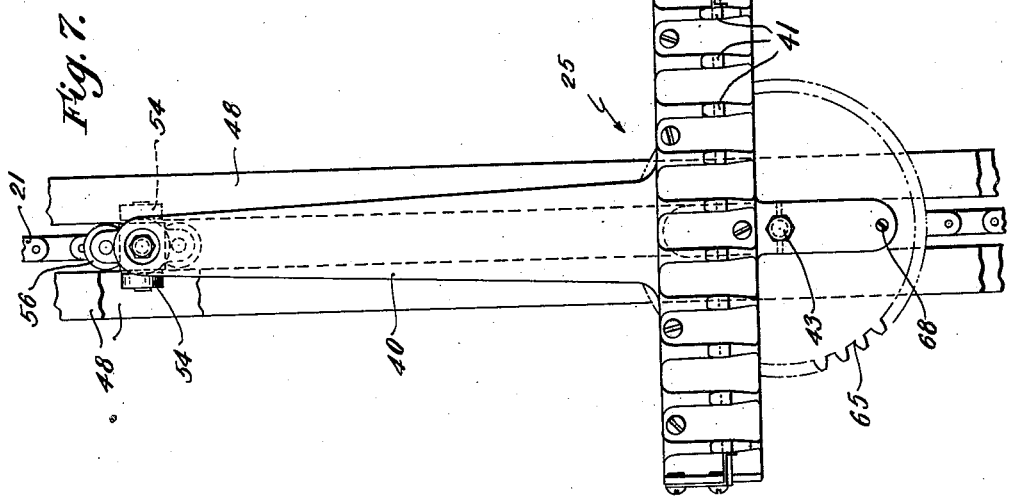
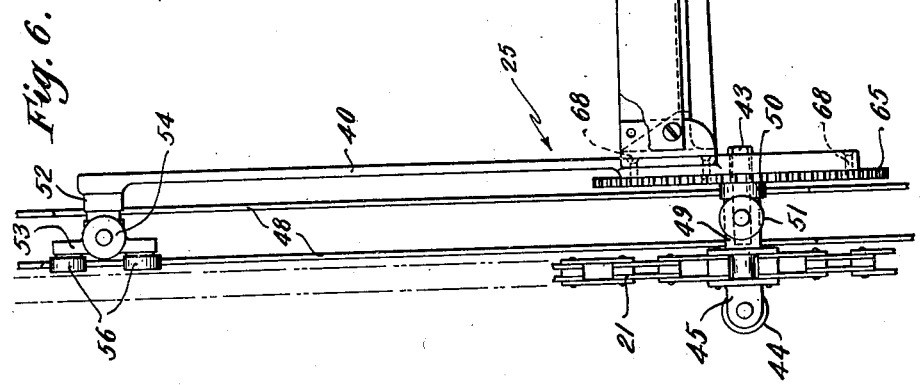
Inventor,
John Caesar,
by Roberts, Cushman & Woodbury
Att'ys.

Oct. 1, 1940.   J. CAESAR   2,216,685
CONVEYER
Filed Oct. 20, 1938   24 Sheets-Sheet 5

Inventor,
John Caesar,
by Roberts, Cushman & Woodberry
Attys.

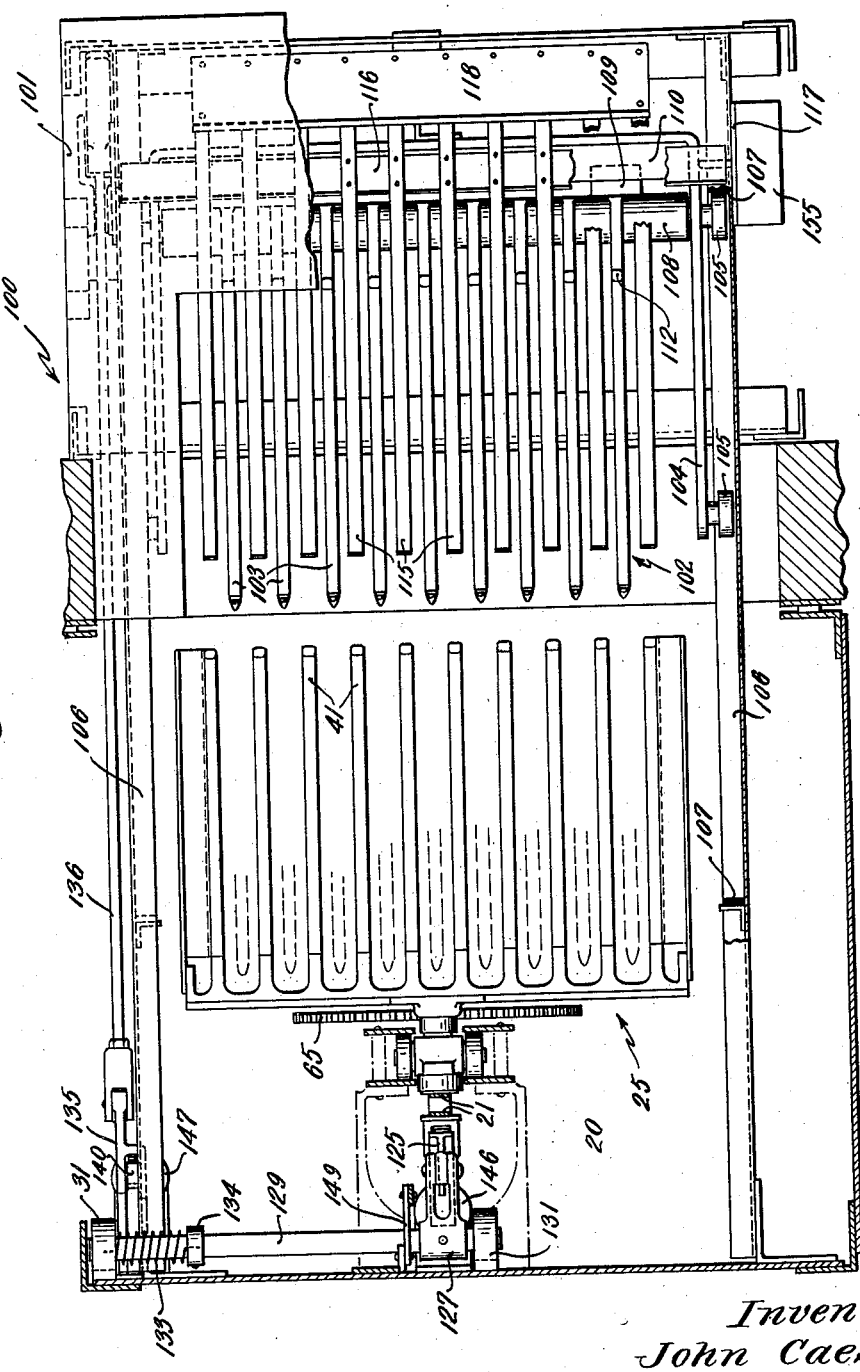

Oct. 1, 1940.   J. CAESAR   2,216,685
CONVEYER
Filed Oct. 20, 1938   24 Sheets-Sheet 7
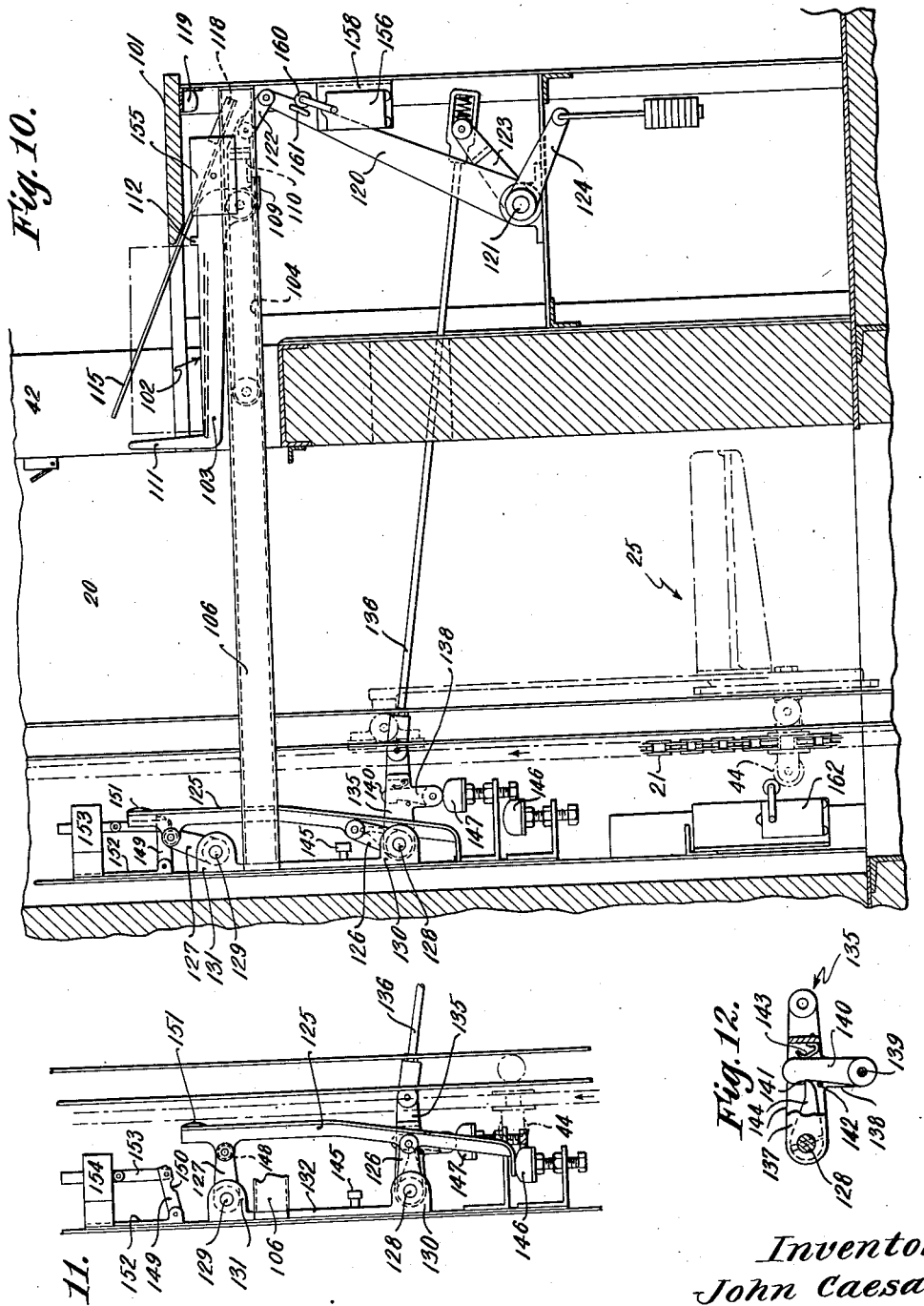
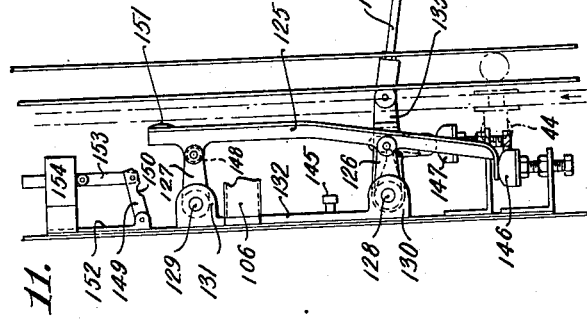
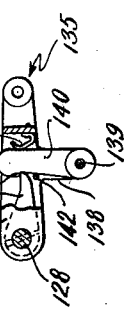
Inventor,
John Caesar,
by Roberts, Cushman & Woodbury
Attys.

Oct. 1, 1940.    J. CAESAR    2,216,685
CONVEYER
Filed Oct. 20, 1938    24 Sheets-Sheet 8

Inventor,
John Caesar,
by Roberts, Cushman & Woodbury
Attys.

Oct. 1, 1940.  J. CAESAR  2,216,685
CONVEYER
Filed Oct. 20, 1938  24 Sheets-Sheet 9

Inventor,
John Caesar,
by Roberts, Cushman & Woodberry
Attys.

Oct. 1, 1940.  J. CAESAR  2,216,685
CONVEYER
Filed Oct. 20, 1938  24 Sheets-Sheet 12

Inventor,
John Caesar,
by Roberts, Cushman & Woodberry
Attys.

Oct. 1, 1940.   J. CAESAR   2,216,685
CONVEYER
Filed Oct. 20, 1938   24 Sheets-Sheet 13

Inventor,
John Caesar,
by Roberts, Cushman & Woodberry
Attys.

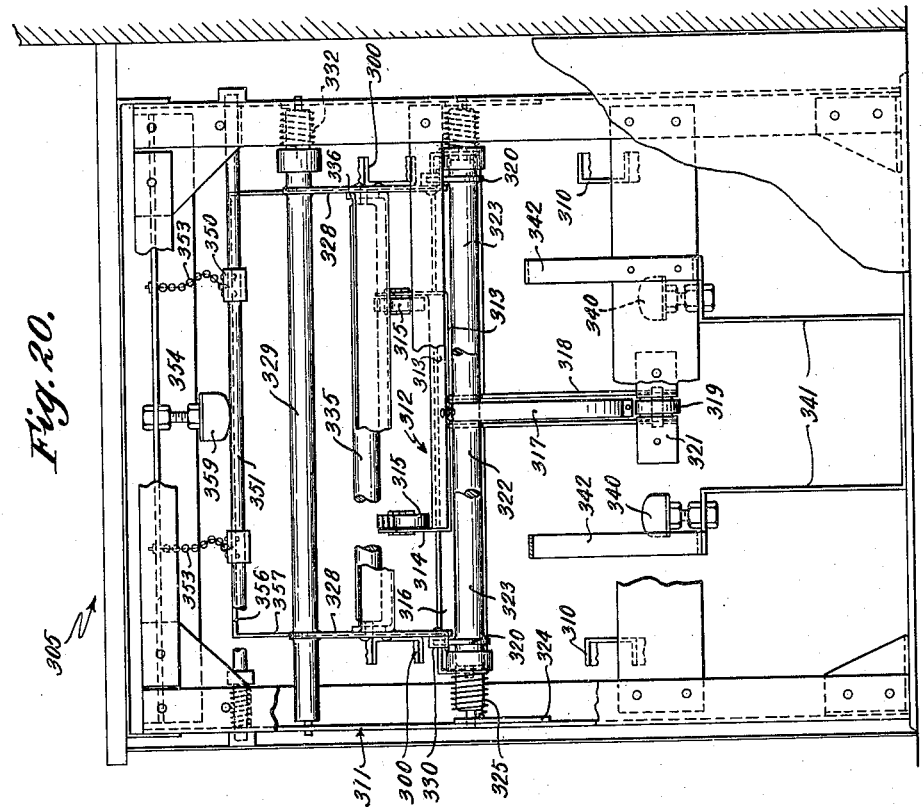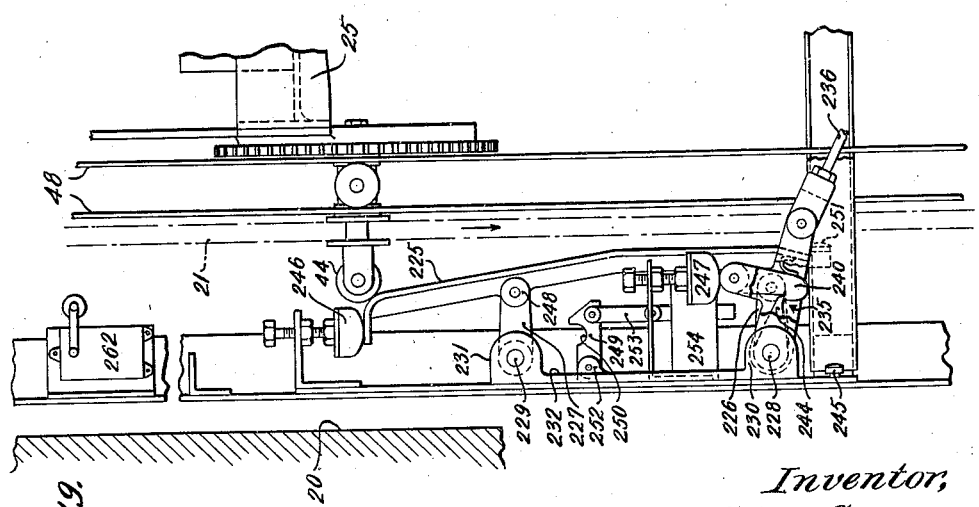

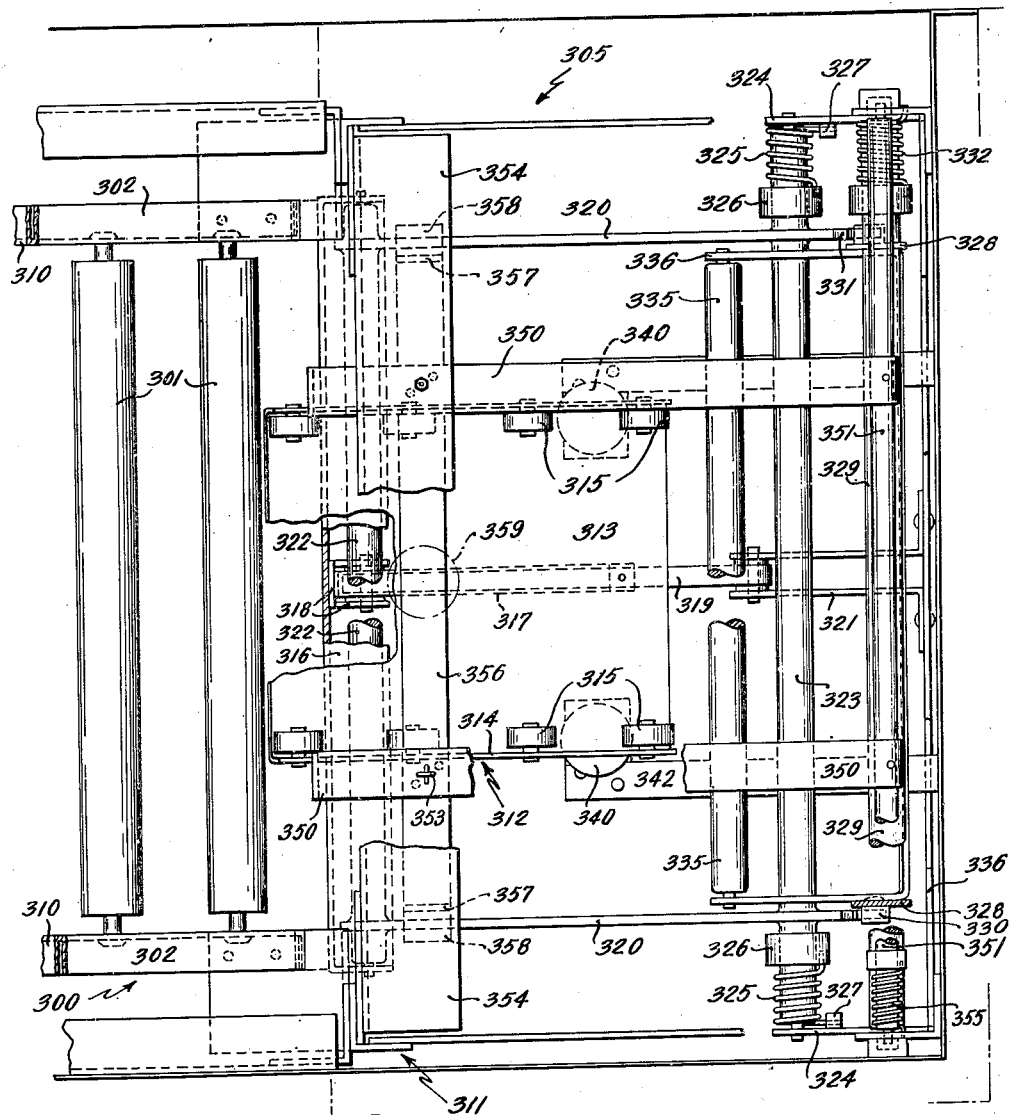

Oct. 1, 1940.  J. CAESAR  2,216,685
CONVEYER
Filed Oct. 20, 1938  24 Sheets-Sheet 16

Inventor,
John Caesar,
by Roberts, Cushman & Woodberry
Attys.

Oct. 1, 1940.                J. CAESAR                    2,216,685
                              CONVEYER
                        Filed Oct. 20, 1938        24 Sheets-Sheet 19

Inventor,
John Caesar,
by Roberts, Cushman & Woodberry
Attys.

Oct. 1, 1940.  J. CAESAR  2,216,685
CONVEYER
Filed Oct. 20, 1938   24 Sheets-Sheet 20

Inventor,
John Caesar,
by Roberts, Cushman & Woodbury
Attys.

Oct. 1, 1940.  J. CAESAR  2,216,685
CONVEYER
Filed Oct. 20, 1938  24 Sheets-Sheet 22

Inventor,
John Caesar,
by Roberts, Cushman & Woodberry
Att'ys.

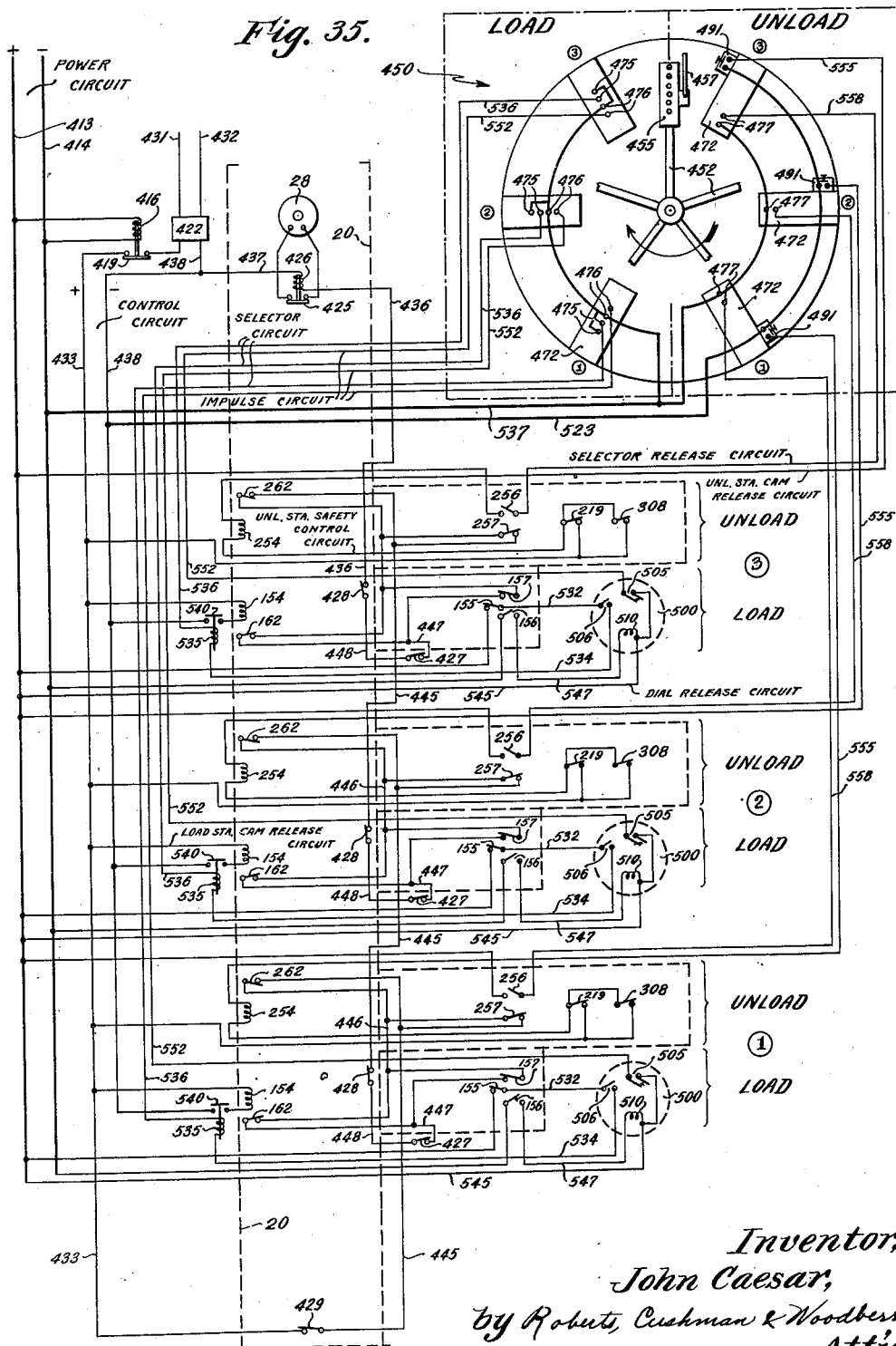

Oct. 1, 1940.  J. CAESAR  2,216,685
CONVEYER
Filed Oct. 20, 1938  24 Sheets-Sheet 24
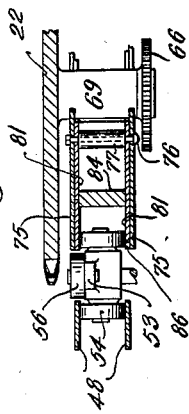
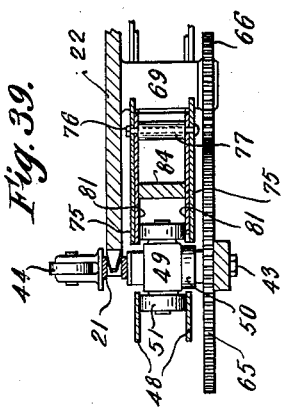
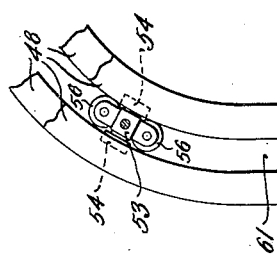
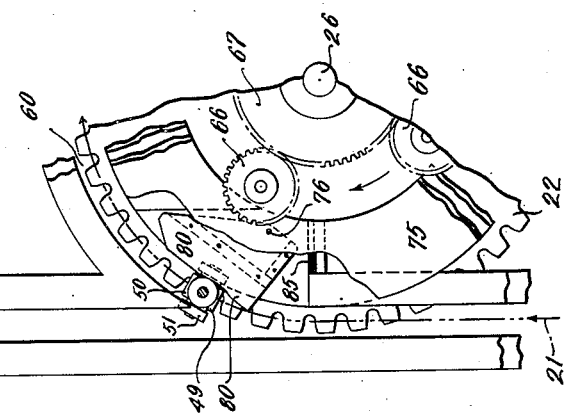
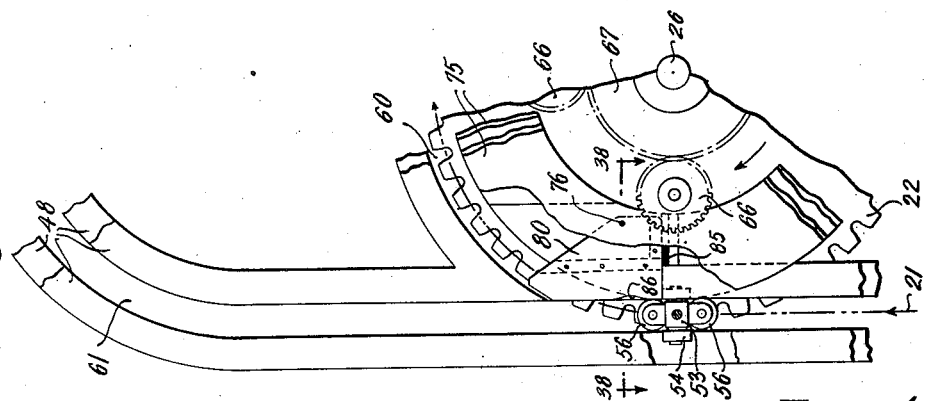
Inventor,
John Caesar,
by Roberts, Cushman & Woodberry
Attys.

Patented Oct. 1, 1940

2,216,685

UNITED STATES PATENT OFFICE 2,216,685

CONVEYER

John Caesar, Syracuse, N. Y., assignor to The Lamson Company, Syracuse, N. Y., a corporation of Massachusetts Application October 20, 1938, Serial No. 236,020

18 Claims. (Cl. 214—11)

This invention relates to an improvement in a conveyer and more particularly in a conveyer adapted to transport loads such as books, pamphlets or other articles vertically between stations located adjacent the conveyer.

The primary object of this invention is to provide means controlled by the operators at the loading stations of the conveyer by which the destinations of the despatched loads are predetermined so that the car on which a load is placed will deliver that load at a selected station and at no other station. A further object of this invention is to provide a single mechanism by which the destinations of the loads on all the cars of the conveyer are determined, such mechanism being under control of the operators at each loading station, the control at each loading station being operable independently, and such mechanism also serving to insure the placing of the loads on empty cars and the passage of any loaded car undisturbed past all other stations except that unloading station to which the load thereon is to be delivered. Other objects of the invention reside in the structure and operation of the conveyer, cars and stations, and in the relation therebetween.

These and other objects will appear from a consideration of the following description of one embodiment of the invention and of the drawings which form a part thereof, and in which Fig. 1 is a view in front elevation of the conveyer, the center portion being omitted;

Fig. 5 is a view of the head sprocket illustrating the passage of car and chain therearound;

Figs. 6 and 7 illustrate in side and front elevation a conveyer car;

Fig. 9 is a plan view of a loading station, and a conveyer car passing in the well;

Fig. 10 is a view in side elevation of a loading station, showing the shelf in the inoperative position, and, in dot and dash lines, a load thereon;

Fig. 11 is a view in side elevation of the loading station operating mechanism in position for actuation by a car;

Fig. 12 is an enlarged view with parts broken away of a detail of such mechanism;

Fig. 19 is a side elevation of an unloading station cam in the operative position;

Fig. 20 is an end elevation of a lowerator with parts broken away associated with an unloading station;

Fig. 21 is a plan view of such lowerator with parts broken away;

Fig. 35 is a simplified wiring diagram wherein only those elements which are essential to the operation of the circuits are represented;

Fig. 36 is an elevation of a portion of the conveyer head sprocket and of the associated tracks setting forth a safety device which may be employed and its relation to the upper end of a car;

Fig. 37 is a view similar to Fig. 36 and differing therefrom in that the relation of the safety device to the lower end of a car is shown;

Fig. 38 is an enlarged cross-sectional view taken along the line 38—38 in Fig. 36; and Fig. 39 is a view similar to Fig. 38 showing in place of the upper end of a car the lower end thereof.

Figure 1:
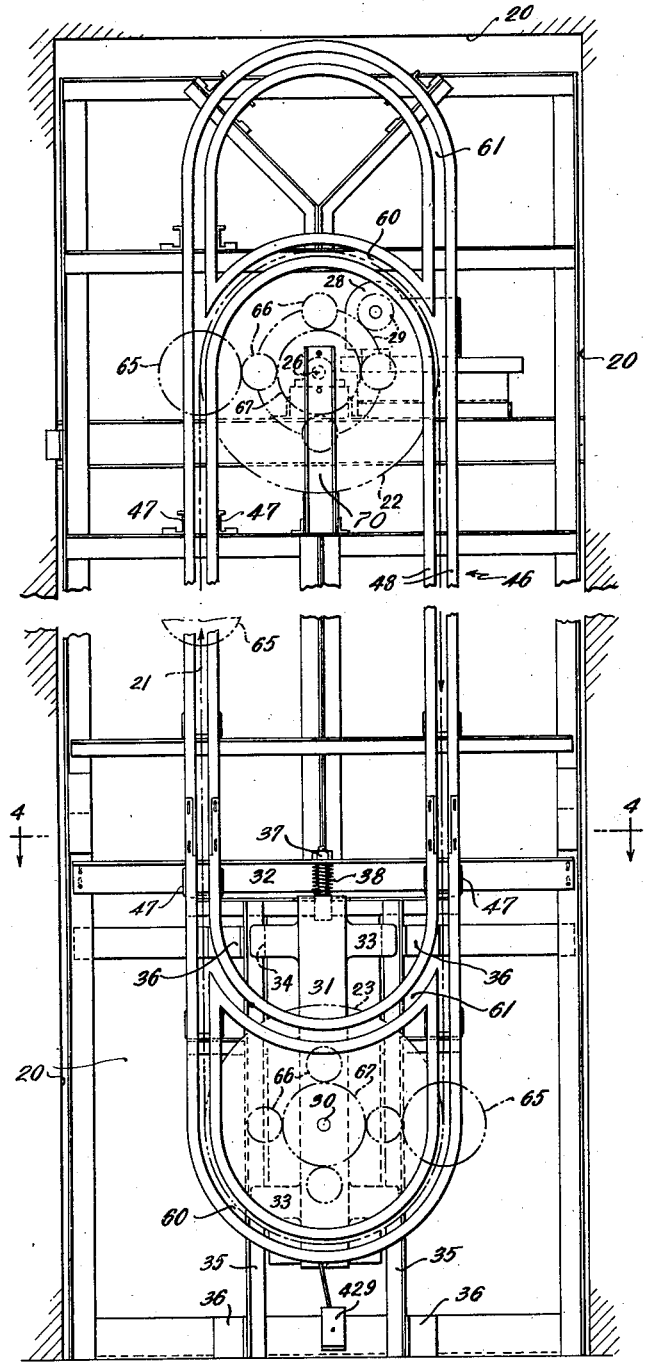
Figure 3:
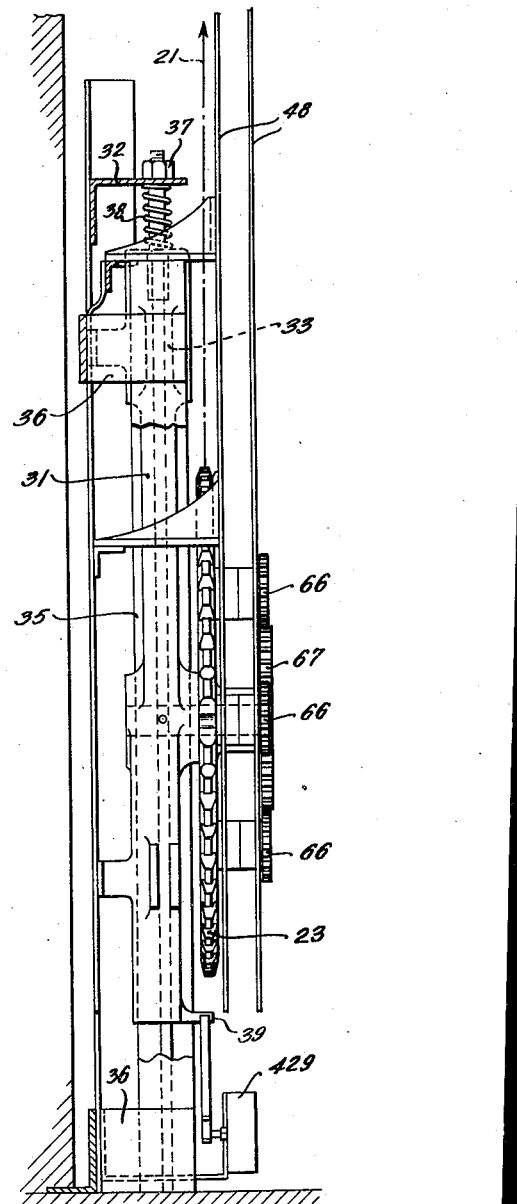
Fig. 3 is a view similar to Fig. 2 of the foot sprocket of the conveyer.
Figure 2:
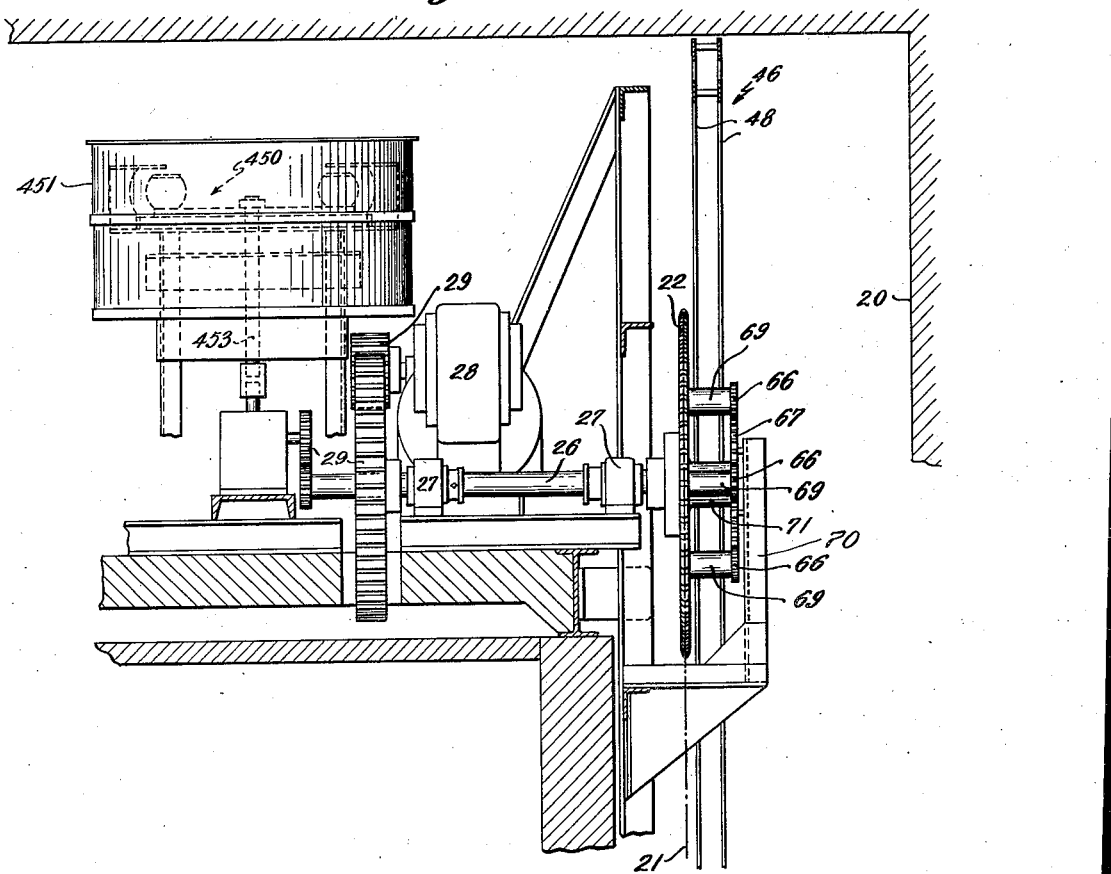
Fig. 2 is a view in side elevation, partly in section, of the head sprocket, the conveyer driving means, and the car-selecting and destination-controlling mechanism.
Figure 4:
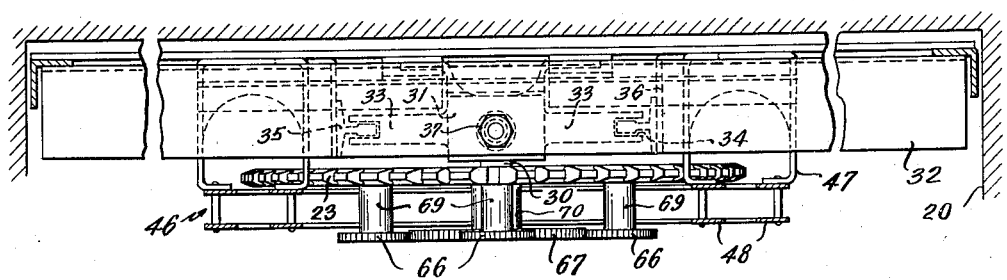
Fig. 4 is an enlarged cross-sectional view of the foot sprocket taken along the line 4—4 of Fig. 1.

The conveyer shown is of the well-known vertical type which travels in a well 20 and includes an endless chain 21, a head sprocket 22, a foot sprocket 23, and a plurality of vertically spaced cars 25. The head sprocket 22 is mounted upon a shaft 26 supported in suitable bearings 27 and driven by a motor 28 through gearing 29. The foot sprocket 23 is mounted to rotate on a fixed shaft 30 carried by a base 31. The base 31 is suspended from a cross-bar 32 and is reciprocal to take up slack in the chain 21, having arms 33 provided with end pockets 34 which receive stationary guide rails 35 positioned by angle brackets 36. A nut and bolt assembly 37 connects the base 31 and bar 32 and a spring 38 surrounding the bolt urges the frame downwardly away from the bar 32. Projecting forwardly from the bottom of the base 31 is a stud 39 which normally engages the arm of a take-up switch 429 and holds it closed as will be set forth below.

Figure 8:
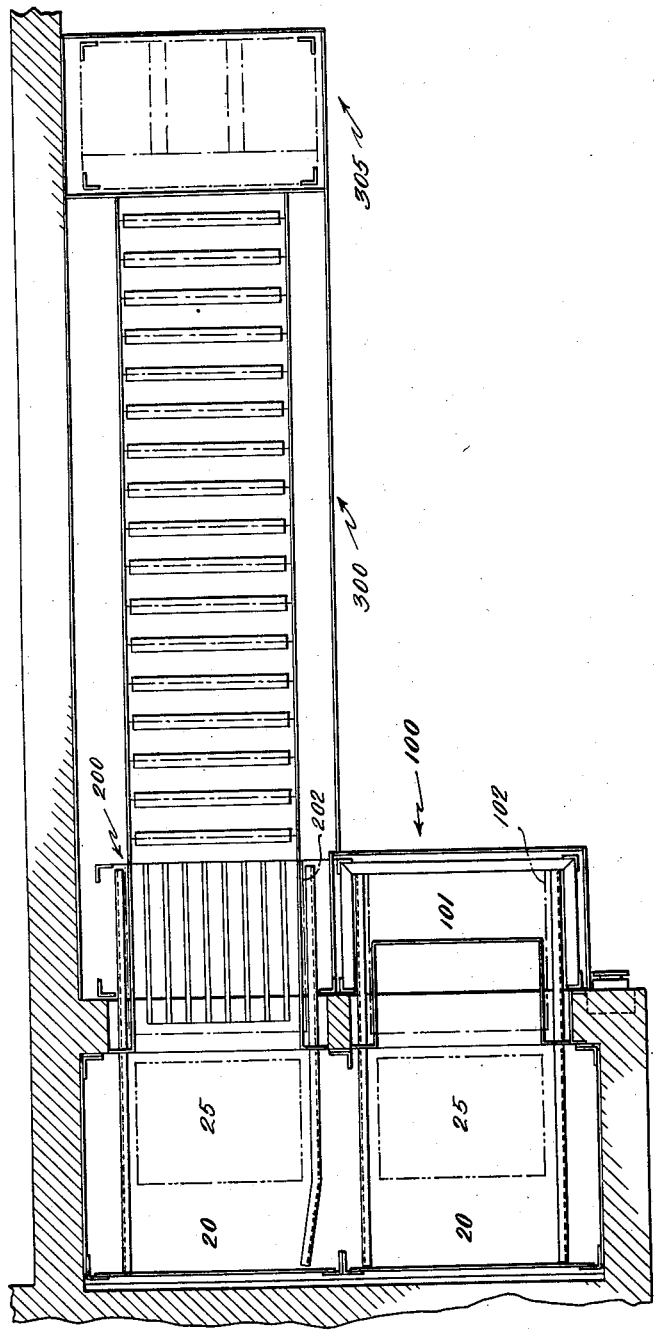
Fig. 8 is a plan view of a typical floor unit comprising a loading station and an unloading station.

The platforms of the cars are, at all times, horizontal and travel at the same side of the conveyer chain plane. The loading and unloading stations at each floor are arranged as shown in Fig. 8 of the drawings, the cars being loaded on the upward travel and unloaded on the downward travel.

Each car 25 comprises a cross shaped plate 40, from the horizontally extending portion of which project horizontally spaced fingers 41 which form the load-carrying platform 42. The car is attached to the chain 21 by a bolt 43 having at the end a roller 44 carried by a bracket 45 and freely rotatable therein.

The cars are guided in their travel by a track consisting of guides 46 supported upon the ends of yokes 47 secured to the wall of the well and engaged by the rollers 50 and 51 on the cars. Each guide 46 comprises a pair of parallel plates 48 joined to the yokes by bolts and spaced apart by sleeves through which the bolts pass. Swivelled on the bolt 43 is a sleeve 49 having at the outer end a roller 50 which travels in the space provided between the outer plates 48 and supporting, on axes at right angles to the sleeve, rollers 51 which travel between the outer and inner plates 48 in each guide 46. The upper end of the car 25 is provided with similarly acting guiding rollers. A boss 52 on the plate 40 enters the space between the outer plates 48. A swivelled block 53 is attachd to the plate 40 by a bolt passed through the boss 52. Carried by the block 53 are a pair of rollers 54 which, like the rollers 51, travel between the outer and inner plates 48 of each guide 46 and a pair of vertically spaced rollers 56 which travel between the edges of the inner plates 48.

The guides 46 at top and bottom are formed to provide two arcuate passages, one for the bolt and rollers attached to the bottom of the car and the other for the bolt and rollers attached to the top of the car. The passages 60 register with the chain and conduct the bottom of the car while the passages 61 similarly conduct the top of the car. Means are provided to hold the car platforms 42 horizontal at the turns. Such means comprise a gear 65 fixed on the car, four freely rotatable idler gears 66 carried by the sprockets 22 and 23 and in mesh with stationary gears 67 concentric with the sprockets. The gear 65 is fixed to the plate 40 by a plurality of pins 68, the bolt 43 passing through the center of the gear. The gears 66 are mounted upon posts 69 carried by the sprockets. The gear 67 at the sprocket 22 is fixed to a beam 70 and spaced from the sprocket by a shoulder 71 on the shaft 26. The other gear 67 is fixed to the shaft 30. As a car approaches one of the sprockets the gear 65 thereon meshes with one of the idler gears 66 and remains in engagement therewith as the chain passes around the sprocket. The gear 66 being in mesh with the stationary gear 67 is rotated about its axis and revolved about the gear 67 as the sprocket turns. This movement of rotation of the gear 66 in mesh with the gear 65 on the car ensures that the car platform remains at all times horizontal. This is clearly shown in Fig. 5 wherein three of the positions assumed by the car are set forth. The number of gears 66 is determined by the spacing of the cars and may be varied accordingly. Thus a single gear may under some conditions be sufficient.

The bolt and rollers attached to the top of the cars may be prevented from entering the passages 60 as the cars travel around the head of the conveyer by the safety device shown in Figs. 36 to 39, inclusive. The lower edges of the passage 60 are formed by annular rings 75 supported upon the plates 48 of the guides as shown in Figs. 36 and 37. The rings are connected by bolts 76 passed through sleeves 77. Pivotally supported upon one of the bolts 76 is a guard 80 comprising two irregularly formed plates 81 through which the bolt passes. The plates are connected by bolts and spaced apart by sleeves and bars 84. The plates 81 normally rest upon a block 85 of rubber or similar material carried between the rings 75 so that the outer edges form a continuation of the plates 48, and extend across the passage 60 (see Fig. 36). If the upper end of a car should attempt to enter the passage 60 the guard would be tilted on its pivot and the lower edge of the inner plate 81 would strike the lower roller 56, thus preventing the guard from further tilting so that the upper end of the car is compelled to continue up and around the passage 61. The lower end of the car, however, enters the passage freely since the guard is not prevented from tilting. The notch 86 in the edge of the outer plate 81 receives the roller 50 and thus insures the tilting of the guard without any binding. (See Fig. 37.) As soon as the lower end of the car has passed the guard it returns by gravity to its normal position on the block 85.

Figure 14:
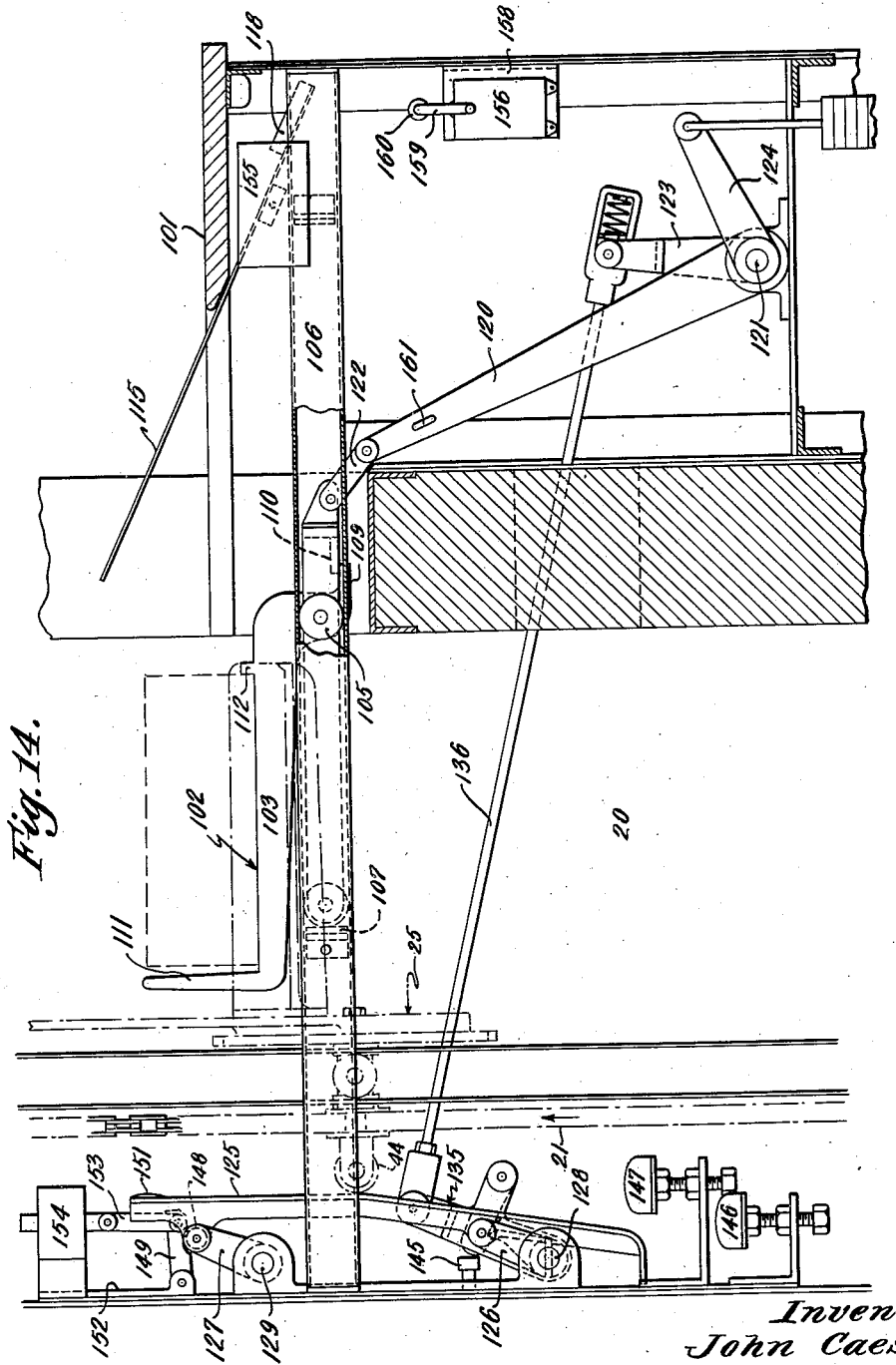
Fig. 14 is a view similar to Fig. 10 showing the station shelf in the path of travel of the car (shown in dot and dash lines) for delivery of a load to the car, the load being indicated on the shelf by dash lines.

Each loading station 100 comprises a U-shaped counter 101 open to the well 20 and a loading shelf 102 consisting of a plurality of horizontally spaced fingers 103 pivotally supported in a reciprocable yoke 104. The yoke 104 is provided with rollers 105 which ride in tracks 106 mounted at the sides of the station below the counter and extended across the wall (see Figs. 10 and 14). Bumpers 107 mounted in the tracks define the limits of travel of the yoke. The fingers 103 project from a cross rod 108 and may, as here shown, be integral therewith. The rod 108 is pivotally supported in the opposite arms of the yoke and is provided with tongues 109 which project below a flange 110 fixed at the base of the yoke to limit the pivotal movement of the rod in one direction. This is a safety feature whereby if the fingers should remain in the well they would be raised by the cars approaching from below. Each finger 103 has at its outer end an upwardly extending flange 111 and adjacent the cross rod 108 a stud 112. A load on the shelf is thereby located between the flanges and studs for proper delivery to a car, as shown in Fig. 10. A plurality of straps 115, fixed near the inner ends to a bar 116 pivotally supported in brackets 117 mounted on the counter frame, extend between the fingers 103. Secured to the inner ends of the straps is a plate 118 which serves as a counterweight so that the outer ends of the straps are normally raised as shown in full lines in Fig. 10. The straps are depressed by a load placed on the fingers 103 as will be pointed out below, at which time the plate 118 comes into contact with a bumper strip 119.

The yoke 104 with the fingers 103 is advanced into the path of travel of the cars in the well by a lever 120 fixed at one end to a rock shaft 121 and connected at the other end to the center of the base of the yoke by a link 122. The shaft 121 is oscillated through an arm 123 fixed thereon by mechanism actuated by a car advancing to receive the load on the shelf 102. The shelf 102 is normally held in the retracted position shown in Fig. 10 by any suitable yieldable means, as for example a weight attached to a second arm 124 fixed upon the shaft 121.

Figure 13:
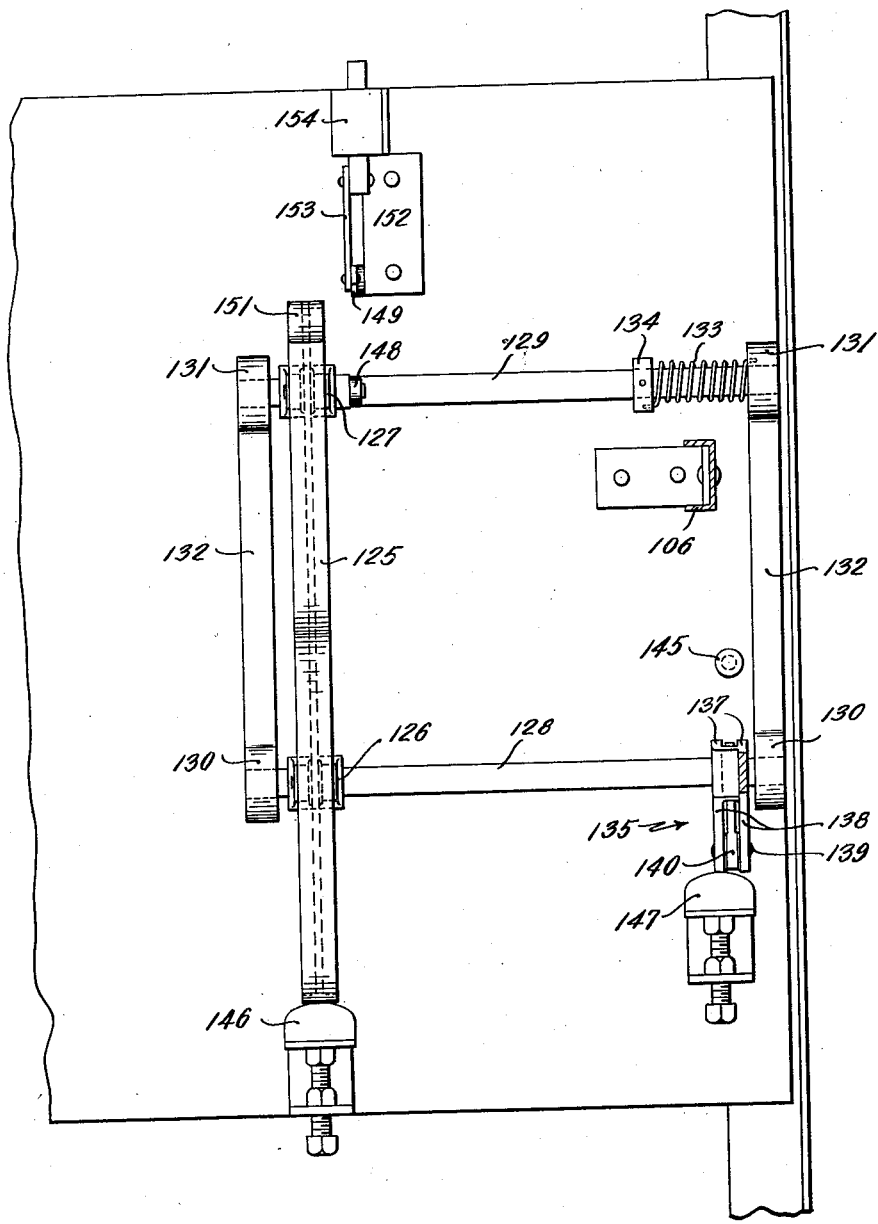
Fig. 13 is a front elevational view of the mechanism shown in Fig. 11.

Mounted in the well 20 is a vertical cam bar 125 adapted to be actuated by the rollers 44 on the cars. The cam bar 125 is pivotally supported on arms 126 and 127 keyed to rock shafts 128 and 129 respectively. The ends of the shafts 128 and 129 are received in bearings 130 and 131 formed in bars 132 (Fig. 13). A spring 133 secured at one end to the bearing 131 and at the other end to a collar 134 pinned to the shaft 129 opposes the action of gravity as the cam bar 125 is moved into the extended position shown in Fig. 11 at which it is in the path of travel of the rollers 44 and will be actuated thereby.

On the shaft 128 is an arm 135 connected by a link 136 to the arm 123 to actuate the rock shaft 121 (Fig. 12.). The arm 135 comprises two parallel horizontally spaced plates 137, one longer than the other, and both engaging the shaft 128 at one end. The link 136 is connected to the other end of the longer plate and the other end of the shorter plate is bent and attached to the longer plate. Preferably the arm 135 is cast as a unit as here shown. Depending from the lower edge of each plate is an arm 138 connected at the free ends by a rod 139. Pivoted on the rod 139 is a latch 140 having a notch 141 therein and being held normally against a pin 142 by a spring 143. Keyed to the shaft 128 between the plates 137 is a pawl 144 adapted to enter the notch 141 in the latch 140. The head of the latch 140 projects beyond the upper edges of the plates 137 so that at one point in the operation of the mechanism it will strike against a stud 145 and release the pawl, as will be pointed out below.

Mounted on the wall of the well are bumpers 146 and 147 so positioned that, as shown in Fig. 11, when the cam bar 125 is in its operative position the lower end of the cam bar rests on the bumper 146 and the lower ends of the arms 138 of the plates 137 rest on the bumper 147. The spring 133, by opposing the action of gravity, serves to reduce the shock upon the cam bar when its movement is checked by the bumpers. The cam bar 125 is held in the normal inoperative position shown in Fig. 10 by the coaction of a roller 148 fixed to the bar, adjacent the joinder of the arm 127 thereto, and a pivotally mounted bar 149 having a notch 150 therein which receives the roller 148. A bump or projection 151 on the cam bar at the upper end thereof is engaged by the roller 44 of the car just before leaving the bar and thus the bar is shifted into the final position at which it is held by the roller 148 and bar 149. The bar 149 is pivoted at one end to a plate 152 and connected by a link 153 to a cam bar solenoid 154 which when energized raises the bar to release the roller 148 and allow the force of gravity to advance the cam bar into the operative position shown in Fig. 11.

Figure 15:
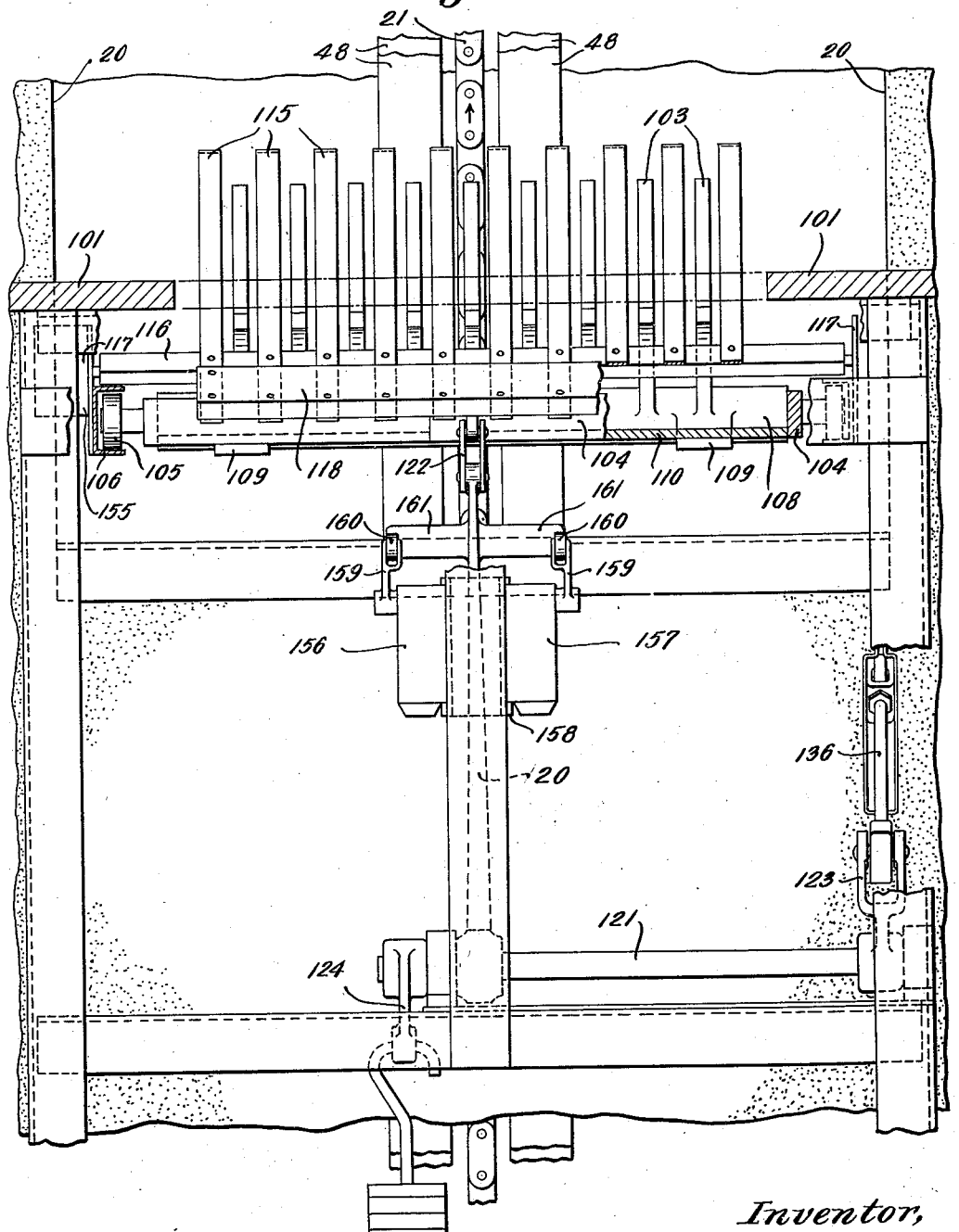
Fig. 15 is a front elevational view of the loading station at rest with parts broken away.
Figure 16:
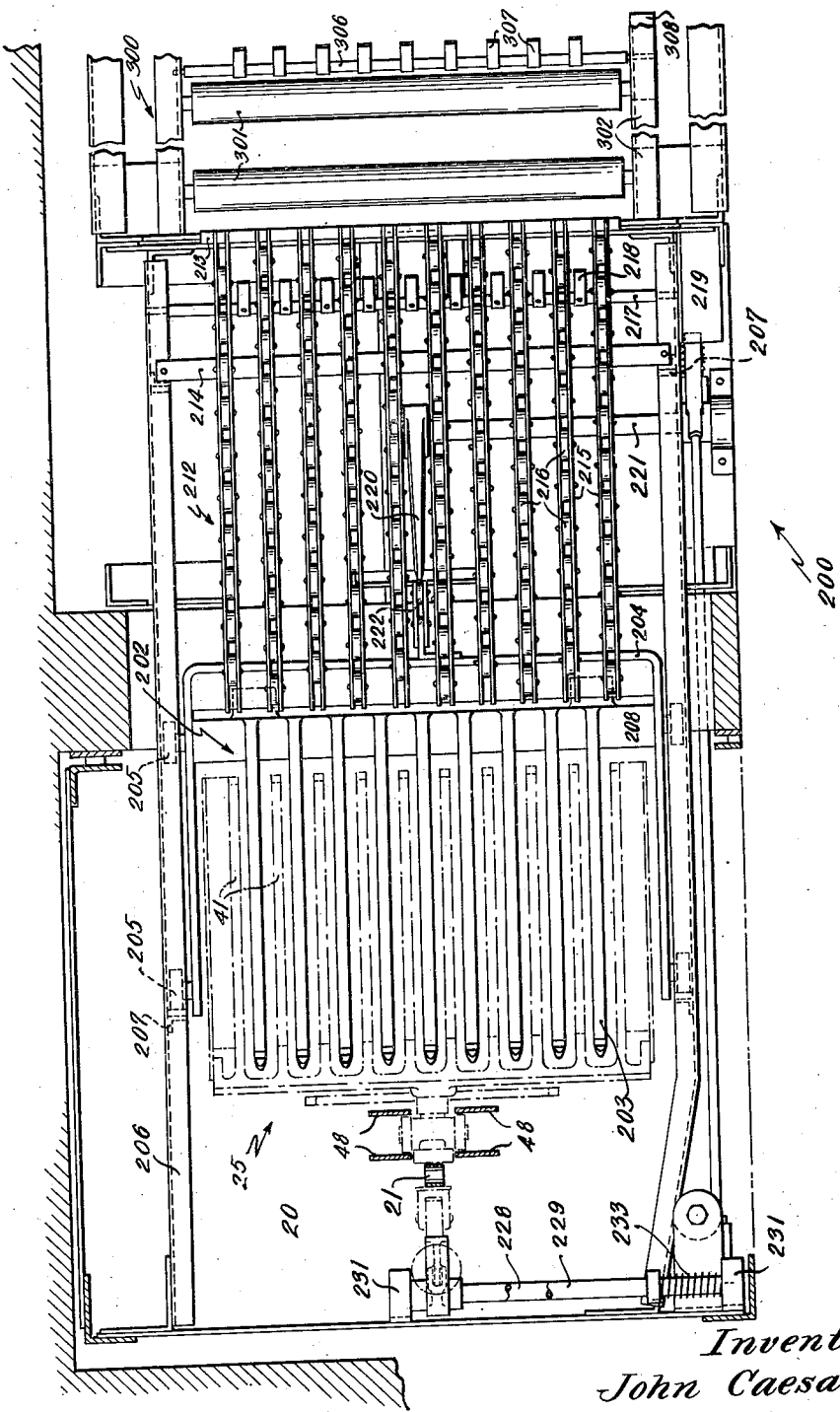
Fig. 16 is a plan view of a typical unloading station with the shelf in position to receive a load.

The loading is controlled by electrical means so that the operation of the cam bar takes place only when there is a load ready at the station 100 and the car 25 approaching the station is free to receive it. Such means include a normally open load switch 155 associated with the straps 115 and switches 156 and 157 associated with the lever 120 (see Fig. 15). The switch 155 is mounted upon one of the brackets 117 and is closed when the straps 115 are depressed by the placing of a load upon the shelf 102. The switches 156 and 157 are carried by a U-shaped bracket 158 mounted below the counter 101. These switches are of a well-known type each including an actuating arm 159 carrying a roller 160. Projecting from the sides of the lever 120 are tongues 161, which, when the lever is in the inoperative position (see Fig. 10) trip both switch arms 159 opening the dial release switch 156 and closing the safety switch 157. When the lever 120 is swung forwardly to advance the shelf 102 the status of both switches is changed automatically by yielding means (not shown). Mounted in the well below the cam bar 125 at each loading station is a safety switch 162 which is tripped by the roller 44 of each car as it approaches the station (Fig. 10). The interrelation of functions performed by these switches will be set forth below in the description of the operation of the conveyer.

Figure 17:
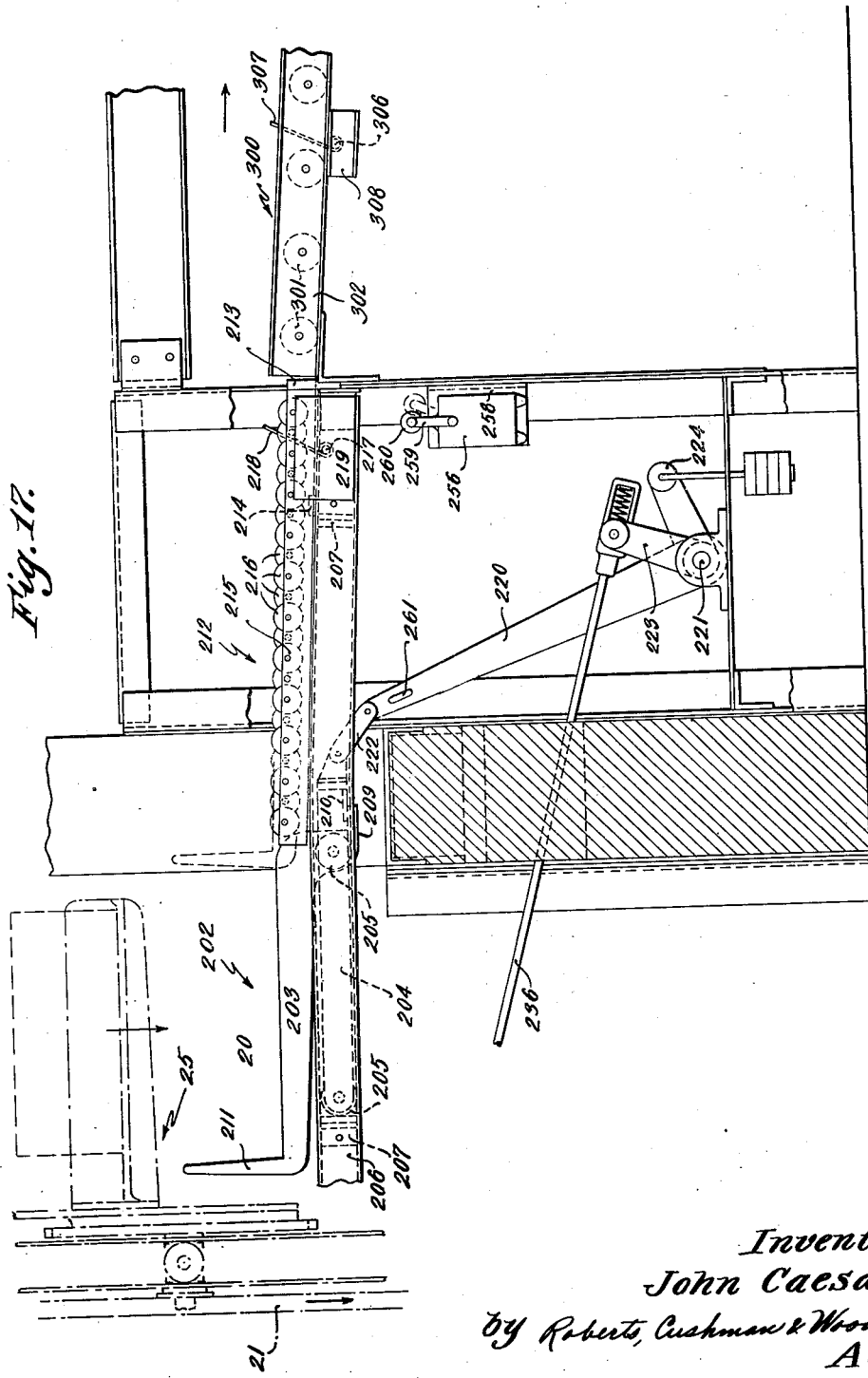
Fig. 17 is a view in side elevation, partially in section, of such unloading station.
Figure 18:
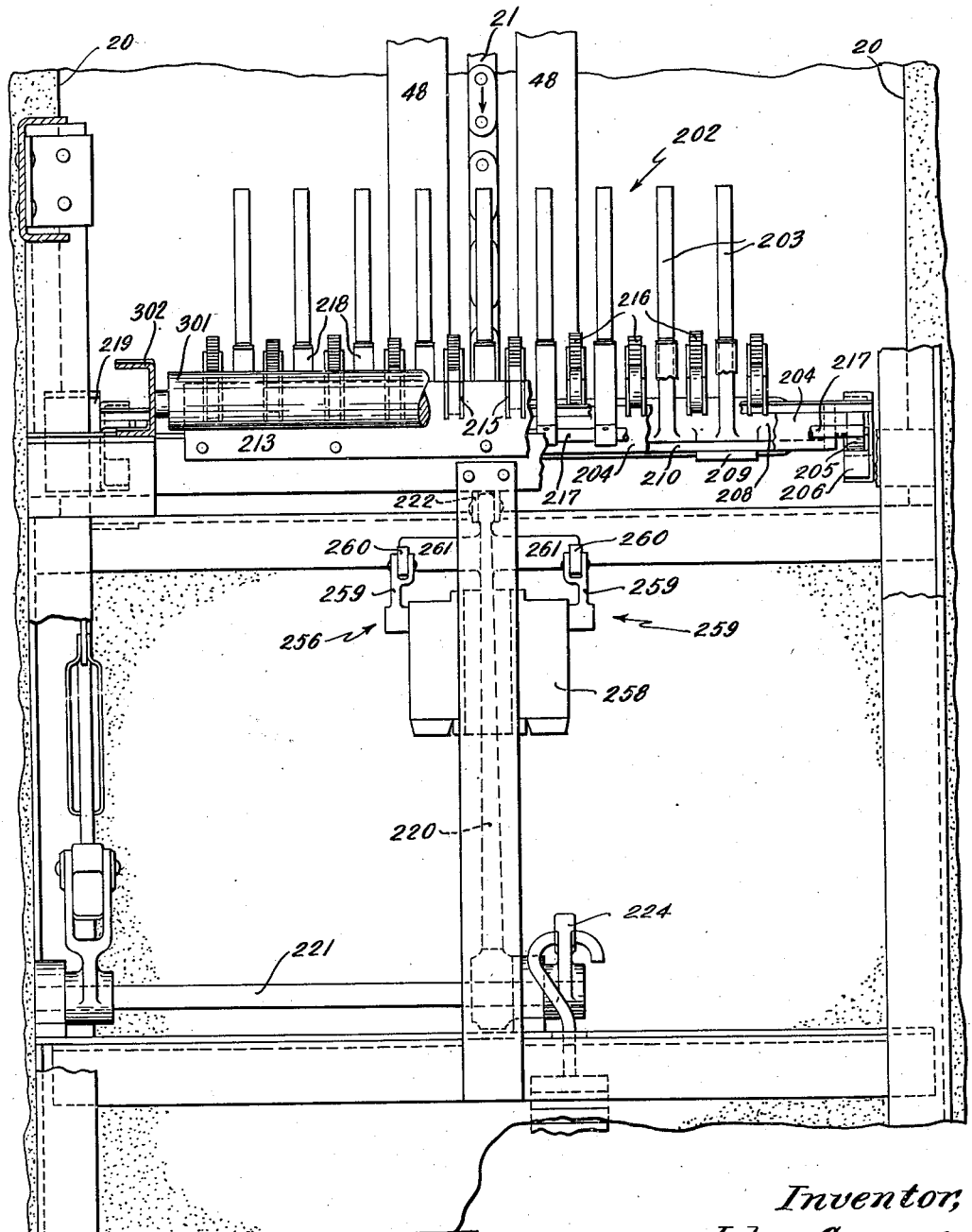
Fig. 18 is an end elevational view of the unloading station in such position.

Each unloading station 200 has many elements and features similar to those in each loading station. The unloading shelf 202 consists of a plurality of fingers 203 supported in a reciprocable yoke 204. Rollers 205 carried by the yoke ride in tracks 206 which extend across the well 20 and are provided with bumpers 207 to limit the travel of the yoke. The fingers 203 project from a cross rod 208 pivotally supported in the opposite arms of the yoke and tongues 209 projecting therefrom below a flange 210 on the yoke limit the downward movement of the fingers. The fingers 203 terminate in upwardly extending tips 211. Fixed in the frame of the station above the yoke 204 are a plurality of downwardly inclined load-supporting rails 212 mounted upon crossbars 213 and 214. Each rail 212 comprises a pair of side plates 215 and a plurality of idler rollers 216 mounted therebetween. The tracks 206 are also inclined downwardly from the well (see Fig. 17) and the tops of the rollers 216 project slightly above the fingers 203 when retracted as shown in Fig. 17. Mounted upon a crossbar 217 are a plurality of fingers 218 which extend between the rails 212. The bar 217 is rotatably supported in the tracks 206 and is connected at one end to a normally closed rotary switch 219 which is opened when the fingers 218 are tripped by a load at the station as will be set forth hereinbelow.

The shelf 202 is advanced into the well by a lever 220 fixed upon a rock shaft 221 and connected to the yoke by a link 222. The shaft 221 is oscillated through an arm 223 by car-actuated mechanism in the same manner as is the shaft 121 of each loading station. The shelf is withdrawn from the well and normally held in the retracted position by any suitable means as, for example, a weight suspended from an arm 224 fixed to the shaft 221. The car-actuated mechanism comprises a cam bar 225 pivotally supported upon arms 226 and 227 keyed to rock shafts 228 and 229 respectively. The rock shafts 228 and 229 are suitably supported at the ends in bearings 230 and 231 formed in bars 232. A spring or other means (not shown) urges the cam bar 225 into the extended position shown in Fig. 19 at which it is in the path of travel of the roller 44 on the car 25. An arm 235 is pivotally mounted on the rock shaft 228 and connected by a link 236 to the arm 223 on the shaft 221. The arm 235 is here shown identical in construction with the arm 135 previously described, and is actuated by a latch 240 and a pawl 244 fixed on the shaft 228. The cam bar 225 is forced back to the wall of the well by the roller 44 as the car descends, thus causing the arm 235 to act upon the shaft 221 and advance the shelf into the path of the car. A stud 245 is so positioned that it will be struck by the head of the latch 240 when the cam bar is in its final retracted position, whereupon the arm 235 is released and the shelf 202 retracted by the weight as shown.

Bumpers 246 and 247 limit the movement of the cam bar 225 into the operative position. The cam bar 225 is held in the normal inoperative position by the coaction of a roller 248 and a pivotally mounted bar 249 having a notch 250 which receives the roller. The cam bar 225 is moved to that position as the car 25 leaves the station by the contact of the car roller 44 with a button or projection 251 at the lower end of the bar. The bar 249 is pivoted at one end to a plate 252 and connected by a link 253 to the plunger of a cam release solenoid 254. When the solenoid is energized the bar 249 is lowered to release the roller 248 and permit the cam bar to advance into the operative position.

The unloading is, like the loading, controlled by electrical means. The shelf 202 and cam bar 225 are normally in the inoperative positions and are only advanced to the operative positions upon the approach of a car 25 carrying a load destined to the station. Such electrical means include the switch 219 which is normally closed, and switches 256 and 257 carried by the bracket 258 and associated with the lever 220. The bracket 258 is mounted below the tracks 206 and the switches 256 and 257, like the switches 156 and 157, each include an arm 259 and a roller 260. Carried by the lever 220 are tongues 261 which engage the rollers 260 and trip both switches when the lever is in the normal inoperative position. When tripped by the tongues the selector release switch 256 is open and the safety switch 257 is closed, and the status of both switches is changed when the lever 220 is advanced from the normal position. Mounted in the well is a switch 262 which is tripped by the roller 44 of each car as it passes. The interrelation and functions of these switches will also be set forth hereinbelow in the description of the operation of the conveyor.

The loads delivered from the cars to the shelf 202 are carried thereby to the rollers 216 over which they move by gravity to an inclined roller conveyer 300 comprising freely rotating rollers 301 supported at the ends in side rails 302. Over the roller conveyer 300 the loads pass to a lowerator 305 by which the loads are automatically and successively lowered to a second roller conveyer 310 which transports them to any desired destination.

A crossbar 306 carries a plurality of fingers 307 which project between a pair of rollers 301 into the path of travel of the loads over the conveyer 300. The bar is rotatably supported by the side rails 302 and is connected at one end to a normally closed switch 308. The bar 306 is so spaced from the bar 217 that a single load can trip only one set of the fingers, and thus under normal conditions both switches 219 and 308 will not be opened at the same time. This is a safety feature which will be more fully discussed hereinbelow.

The lowerator 305 comprises a vertical frame 311 in which a platform 312 is vertically movable from a position in register with the conveyer 300 to a position in register with the conveyer 310. The platform 312 consists of a base 313 having parallel upwardly projecting side flanges 314 on the inner faces of which a plurality of freely rotatable rollers 315 are supported. The upper plane of the rollers forms a continuation of the upper plane of the rollers 301 of the conveyer 300 when the platform is in its upper position (see Fig. 22) and a continuation of the upper plane of the rollers of the conveyer 310 when the platform is in its lower position (see Fig. 23). The platform 312 rests upon a cross angle beam 316 secured to the base 313 near the forward end thereof and upon a brace bar 317 secured to the base 313 near the rearward end thereof and substantially midway between the sides thereof. A post 318 in the form of a U-beam is secured to and projects downwardly from the center of the angle beam 316 and the brace bar 317 is secured to the post near the lower end thereof.

The platform 312 is lowered and raised by arms 319 and 320. The arm 319 is pivoted at the forward end to the post 318 near the bottom thereof, and is pivoted at the rearward end between brackets 321 projecting forwardly from a cross plate of the frame 311. The arms 320 are two in number and fixed at the forward ends to a rod 322 carried by the inturned ends of the angle beam 316 and are fixed adjacent the rear ends to a rock shaft 323 pivotally carried by gussets 324 secured to the lowerator frame 311. At each end of the shaft 323 is provided a coil spring 325 of which one end enters a collar 326 fixed on the shaft while the other end is passed under a tongue 327 projecting inward from the gusset 324. The springs 325 are of such tension that they normally urge the shaft to cause the arms 320 to raise the platform 312 to the upper position when empty but when a load is placed on the platform they yield to permit its descent with the load thereon.

In order to lock the platform in the upper position when a load is being fed thereon suitable means are provided. Such means are here shown as comprising arms 328 depending from a rock shaft 329 and carrying rollers 330 which enter notches 331 formed at the rearward ends of the arms 320, as shown in full lines on Fig. 22. A suitable spring 332 at one end of the shaft 329 urges the arms 328 forward so that the rollers 330 are at all times in contact with the arms 320 and enter the notches 331 when the platform is in the upper position. Thus the arms 320 serve to support the platform in the upper position and coact with the arm 319 to guide the platform in its descent and ascent. The rollers 330 are moved rearwardly out of the notches 331 by the impact of a load upon a roller 335 carried by the arms 336 of a U-shaped plate which project forwardly and are secured to the arms 328 (see Fig. 22).

Figure 23:
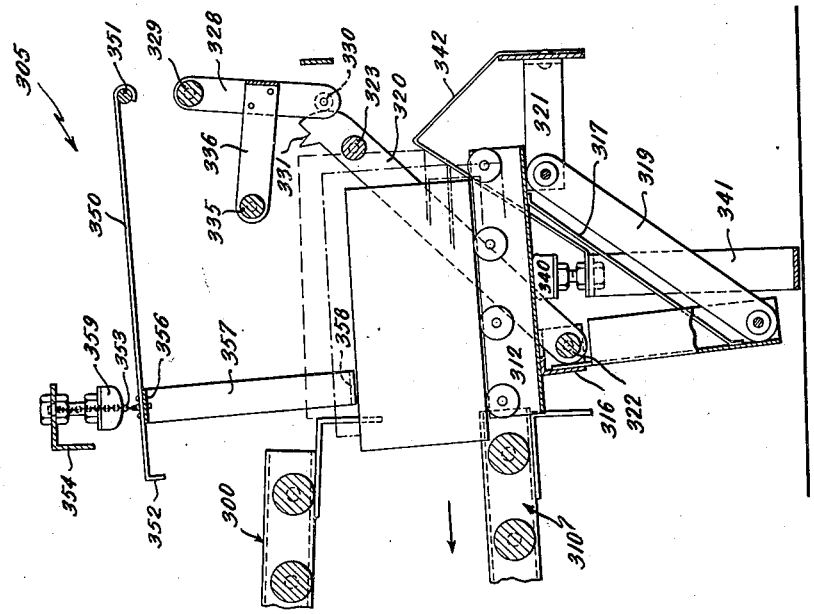
Fig. 23 is a schematic view based on Fig. 22 and illustrating the final position taken by the moving elements, the load having been fully lowered.

The platform 312 is supported in its lower position upon bumpers 340 mounted on upright supports 341. Inverted V-shaped plates 342 each secured at one end to a support 341 and at the other end to the cross plate from which the brackets 321 project are provided, between which the platform 312 descends. As shown in Fig. 23, the load on the platform engages these plates 342 as the platform descends and is thereby given a forward push so that it will roll off the platform onto the conveyor 310, thus freeing the platform and permitting the springs 325 to raise it through the shaft 323 and arms 320.

Figure 22:
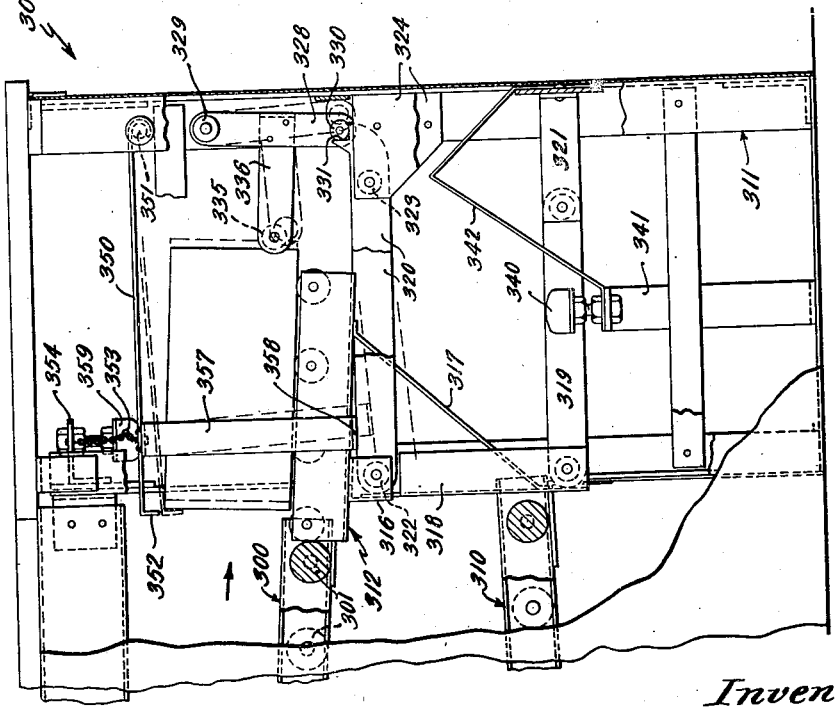
Fig. 22 is a side elevation of a lowerator with parts broken away and a load thereon, illustrating in full lines the inoperative position and in dash lines the position taken as soon as the load is fully in place thereon.

The feeding of a load when the platform 312 is in other than the load-receiving position is prevented by a pair of bars 350 carried by a shaft 351. The forward ends of the bars are bent downward to form stops 352 which, as shown in Fig. 22, move downwardly into the path of travel of the loads when the first load passes onto the platform. Chains 353 secured to the bars 350 and a cross angle plate 354 limit the downward movement of the bars. At one end of the shaft 351 is mounted a spring 355 which, while not of sufficient strength to prevent the lowering of the bars, acts to retard that movement. The bars 350 rest upon and are secured to an inverted U-shaped strap 356. The legs 357 of the strap are bent outwardly at the tips to form flanges 358 which rest upon the arms 320. Supported by the angle plate 354 is a bumper 359 which is engaged by the strap 356 and thus limits the upward movement of the bars 350. After a load has been fed onto the platform 312 and has depressed the bar 335, thus releasing the arms 320 and allowing the platform and load to descend, the stop bars also descend with the arms 320 until the chains limit their movement. As the arms 320 raise the platform they strike the flanges 358 and through the strap 356 raise the bars 350 and hold them up until another load has passed onto the platform and the operations are repeated.

Figure 24:
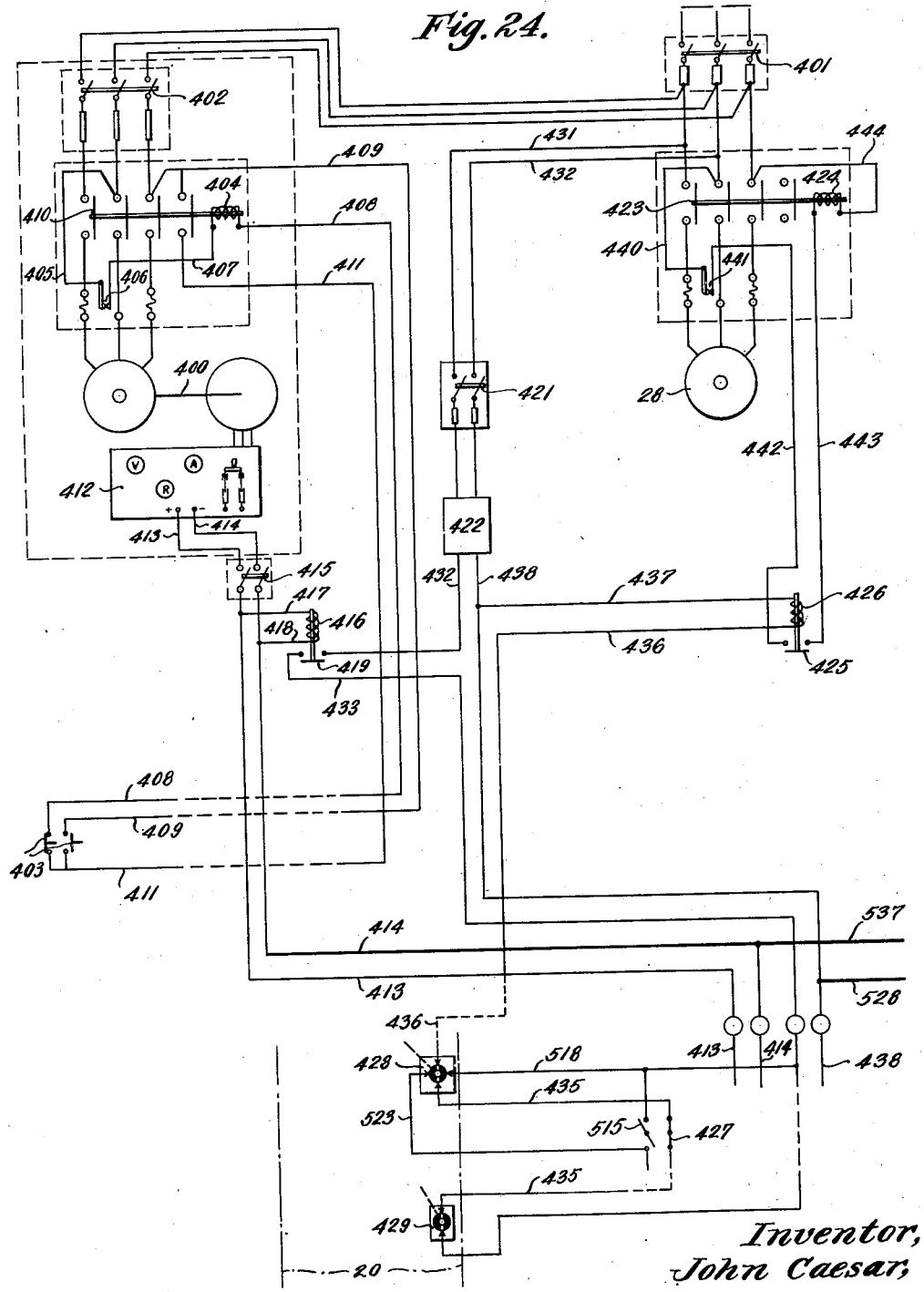
Fig. 24 is a wiring diagram setting forth the main electrical and conveyer operating circuits.
Figure 25:
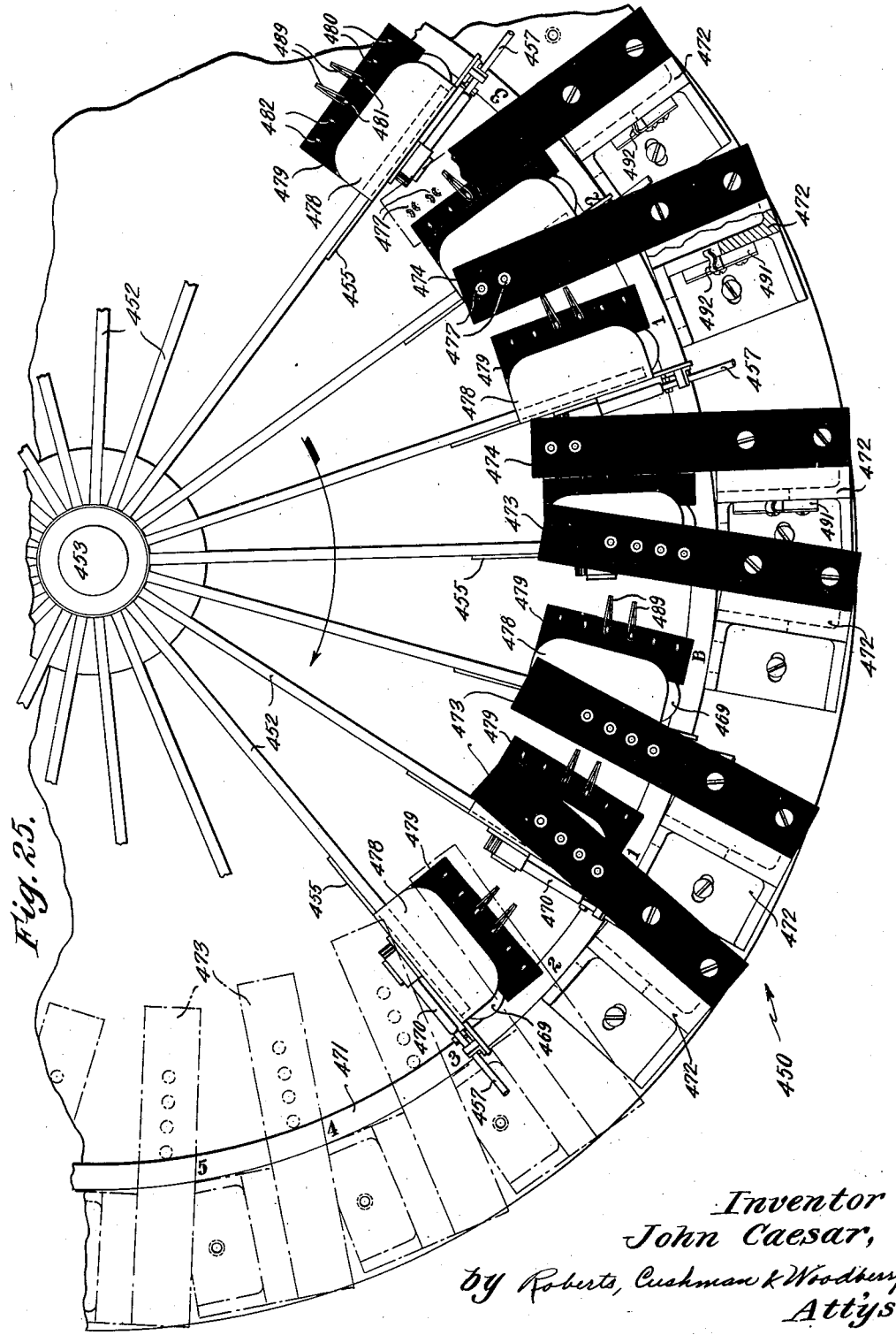
Fig. 25 is a plan view of a portion of the car-selecting and load-controlling mechanism.

The conveyer is continuously driven by the motor 28, the operation of which is controlled by a motor generator 400 as set forth diagrammatically on Fig. 24 of the drawings in which the manually operable switches and the switches which are automatically closed, are shown in open positions. The main leads to the motor generator are controlled by manually operable switches 401 and 402. At one of the stations, preferably the one on the top or twelfth floor, is provided a double contact push button 403 which when closed energizes a relay 404, through lead 405, normally closed reset switch 406, lead 407, relay 404, lead 408, button 403 and lead 409, whereby a switch 410 is thrown. The throwing of the switch 410 completes a circuit from the button 403 through lead 411 which by-passes the relay 404. The current from the generator passes through a board 412 to leads 413, 414 controlled by a manually operable switch 415. A relay 416 connected by leads 417, 418 to the leads 413, 414 controls the operation of a switch 419 in the circuit of the motor 28.

The wiring of the motor circuit includes in addition to the switches 401 and 419, a manually operable switch 421, a transformer 422, a switch 423 controlled by a relay 424, a switch 425 controlled by a relay 426, station switches 427 and lintel switches 428, one at each of the loading stations, and a take-up switch 429 at the bottom of the conveyer. When the switches 401, 419 and 421 and all the station switches are closed, it will be apparent the primary of the transformer 422 is energized from the main leads through the switch 401 and leads 430 and 431 and that the secondary current flows from the transformer 422 through lead 432, switch 419, and lead 433, to the take-up switch 429 (normally closed) at the bottom of the conveyer, and thence through the various stations by leads 435, station switches 427 and lintel switches 428 to the lintel switch 428 at the upper station to lead 436, relay 426, lead 437 and lead 438 to the transformer. For convenience in description the leads 413, 414 will be designated as power leads and the leads 433, 438 as control leads. The energizing of the relay 426 closes the switch 425 and sets up a flow of current from the main leads through the lead 440, normally closed reset switch 441, lead 442, switch 425, lead 443, relay 424 and lead 444 to the main leads. The energizing of the relay 424 closes the switch 423 which completes the supply of current to the motor.

Figure 33:
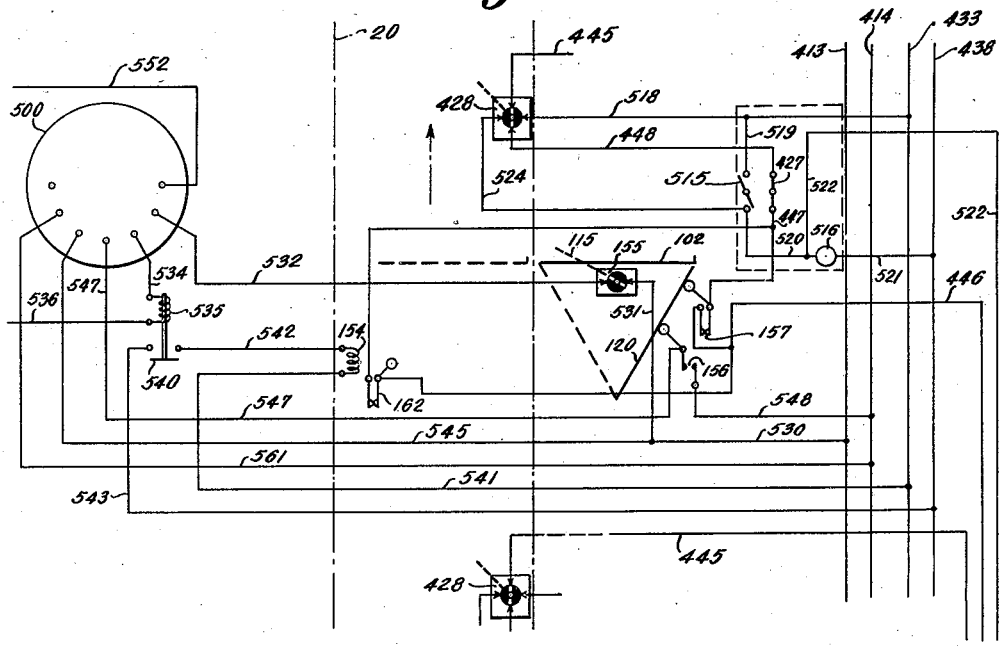
Figure 34:
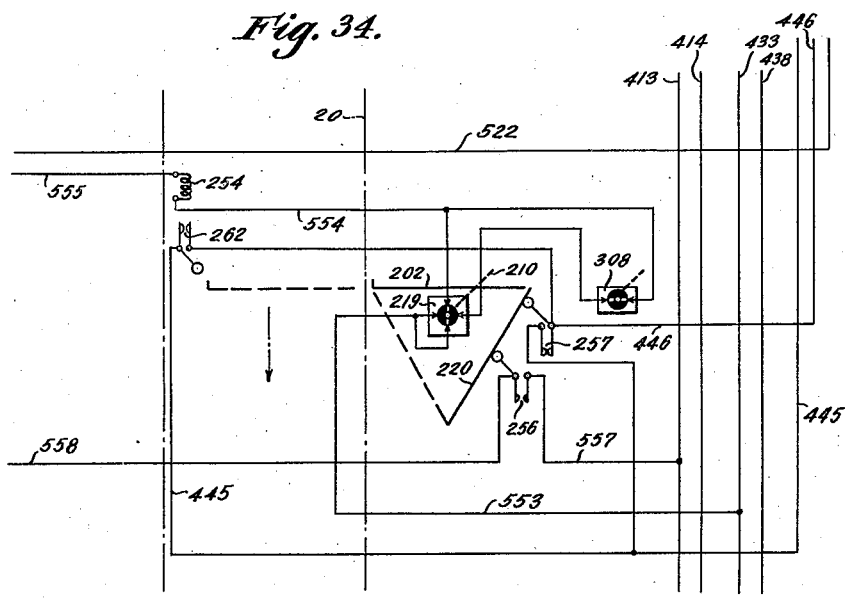

The path of the circuit connecting the switch 428 and the lead 436 is the same at each floor and only that portion at one floor through the typical stations shown in Figs. 33 and 34 will be described in detail, it being understood that the portions at the other floors are identical. Beginning at the lintel switch 428 of the floor below (Fig. 33) the portion of the path of the current at each floor, indicated on Fig. 24 by the broken line 435, comprises lead 445 to the unloading station (Fig. 34), through the switches 251 and 262 arranged in parallel to the lead 446, thence back to the loading station (Fig. 33) through the switches 157 and 162 also arranged in parallel, to the lead 447, and through switch 427 and lead 448 to switch 428. In case of the stations at the bottom floor the current, of course, starts at the switch 429 but otherwise follows the same path.

Thus, from the above description it will be apparent that the operation of the motor depends upon the continued energizing of the relays 416, 426 and 424 and that it is essential for the motor generator to be in operation, and for all the various station switches to be closed.

Figure 28:
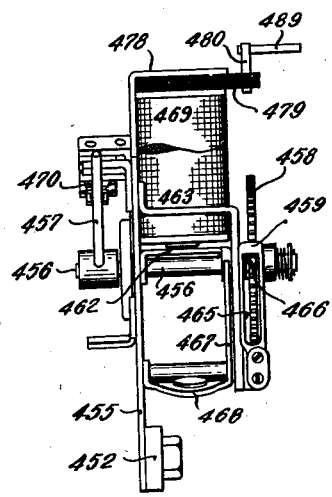
Fig. 28 is an end elevation of such element.
Figure 29:
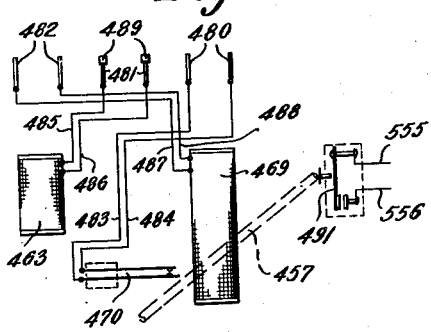
Fig. 29 is a schematic wiring diagram showing the connections between the electrical components of such element.

The loading and unloading of the conveyer cars is controlled by a single timer 450 in response to the operation of a dial 500 at any loading station. The timer 450 comprises a housing 451 which encloses a plurality of radially spaced arms 452 equal in number to the cars of the conveyer and mounted upon and driven by a shaft 453. The shaft 453 is rotated by the motor 28 concomitantly with the conveyer in any suitable manner, but at such slower rate of speed that the shaft 453 makes a single rotation while any car of the conveyer makes a complete circuit. Mounted upon the outer end of each arm 452 is a selector plate 455 at the center of which is a shaft 456 extending through the plate and at right angles thereto. Fixed at one end of the shaft 456 is a contact bar 457 which is moved by the shaft 456 in a plane parallel to the plane of the plate. The shaft is driven by suitable escapement mechanism through a gear 458 fixed at the other end thereof. The escapement mechanism comprises a spring 459 adapted to prevent rotation of the gear in one direction (clockwise in Fig. 26) and a pawl 460. The pawl 460 is carried by an arm 461 pivotally connected to a bar 462 which extends below and is raised by a solenoid 463, when energized, against the urge of a spring 464. The bar 462 is pivotally supported on the shaft 456 (see Fig. 28). The spring 459 is carried by a stationary bracket in which the lower end of the spring is fixed and has a central slot 465 through which projects the end of a latch 466. The latch 466 is pivotally carried by an arm 467 which forms a part of and projects upwardly from a bar 468 which extends below and is raised by a solenoid 469. Mounted above the bar 457 is a switch 470 which is closed by the bar when in its upper inoperative position (shown in dotted lines in Fig. 27) and which is open when the bar is moved out of such position.

Figure 26:
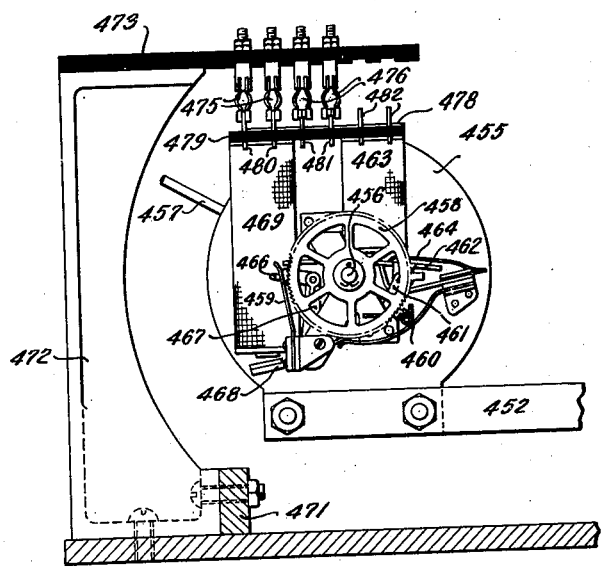
Fig. 26 is a view in side elevation of one face of an element of such mechanism in the car-selecting and load-destination-determining position.
Figure 27:
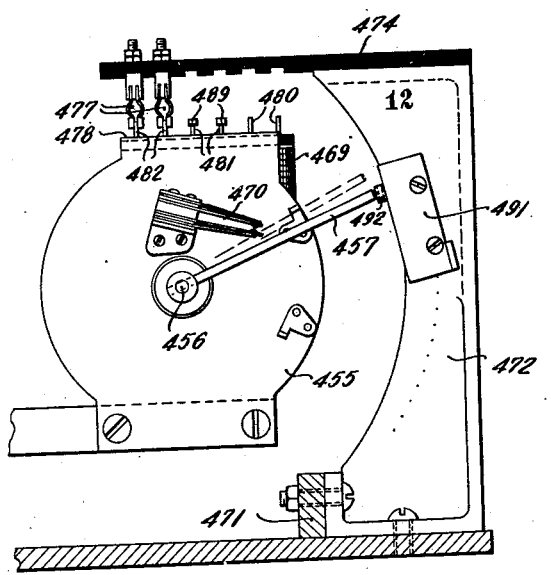
Fig. 27 is a similar view of the other face of such element in the load-delivering position.

The escapement mechanism assumes the position shown in Fig. 26 when the bar 457 is raised and the switch 470 is closed thereby. Upon the energizing of the solenoid 463, hereafter referred to as an impulse solenoid, the bar 462 is raised. Each movement of the bar causes the pawl 460 to engage the teeth of the gear and rotate it one step and at the same time the end of the bar over the latch 466 depresses the latch so that the spring 459 is released to engage the teeth of the gear. When the solenoid 463 is deenergized the arm 462, under the urge of the spring 464, descends lowering the pawl 460 while the spring 459 holds the gear in the advanced position. This operation is, as will be described later, repeated one or more times, thus moving the bar 457 to the desired position. When the solenoid 469, hereinafter referred to as a release solenoid, is energized, the bar 468 is raised swinging the arm 467 and retracting the latch 466 fom the slot 465 in the spring. Upon deenergizing the release solenoid the bar 468, arm 467 and latch 466 resume their normal positions moving the spring away from the gear thereby releasing it and allowing it to be returned to its normal position by a spring or other means (not shown) with the bar 457 raised and the switch 470 closed.

Fixed in the timer housing 451 is a ring 471 concentric with the shaft 453 and mounted upon the base below the arms 452. Upon the base of the timer and secured to the ring 471 are a plurality of spaced posts 472 one assigned to each station. The posts assigned to the loading stations are located on one-half of the ring and the posts assigned to the unloading stations are located on the other half of the ring. On each post 472 is supported a brush block, those on the loading station posts being designated by the numerals 473 and those on the unloading station posts being designated by the numerals 474. Each brush block 473 carries two pairs of brushes 475 and 476 and each brush block 474 carries one pair of brushes 477. The top of each selector plate 455 terminates in a flange 478 below which is secured a block 479 of suitable dielectric material. The solenoids 463 and 469 are suspended from the block 479 which extends rearwardly of the flange and carries three pairs of upwardly projecting blades 480, 481 and 482 so arranged that as the plate travels they successively contact with the brushes on the brush blocks. The blades 480 contact with the brushes 475 on the blocks 473, the blades 481 contact with the brushes 476 on the blocks 473 and the blades 482 contact with the brushes 477 on the blocks 474. The blades 480 are connected by leads 483 and 484 to the blades of the switch 470, the blades 481 are connected by leads 485 and 486 to the impulse solenoid 463, and the blades 482 are connected by leads 487 and 488 to the release solenoid 469. Secured to and projecting rearwardly from each blade 481 are wiper plates 489 which serve to continue the contact with the brushes 476 during an appreciable length of time for a reason which will be set forth below.

The inner edge of each post 472 is curved along an arc concentric with the arc defined by the tip of the contact bar 457. Carried by each post 472 which supports a brush block 474 is a normally open switch 491 and an arm 492 which projects beyond the inner edge so that it will be tripped by the tip of the contact bar and thereby closes the switch. The switches 491 and arms 492 are so located on the posts 472 that in each position taken by the bar 457 other than the upper inoperative position on any plate 455 the arm 492 on one post only will be tripped to close its switch 491 as that plate is rotated by the shaft 453.

As pointed out above the timer shaft 453 is driven in unison with the conveyer, each selector plate 455 is assigned to a particular car and each post 472 is assigned to a particular station, each of the posts assigned to the loading stations supporting a brush block 473 and each of the posts assigned to the unloading stations supporting a brush block 474.

Figure 30:
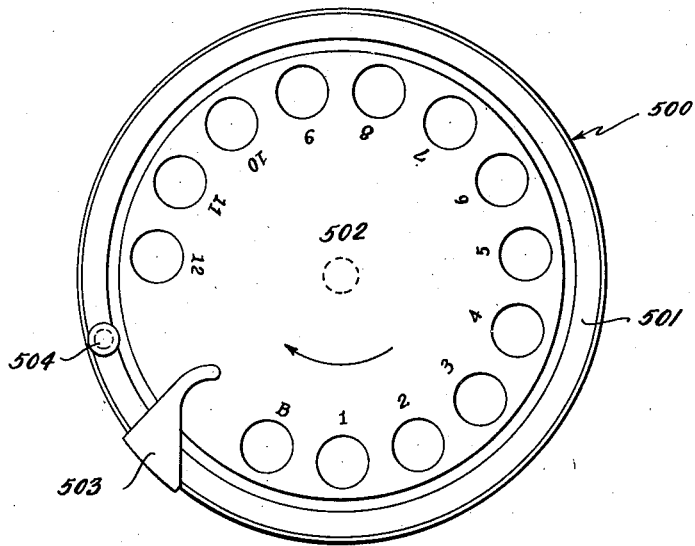
Fig. 30 is a plan view of a selector dial at any loading station.
Figure 31:
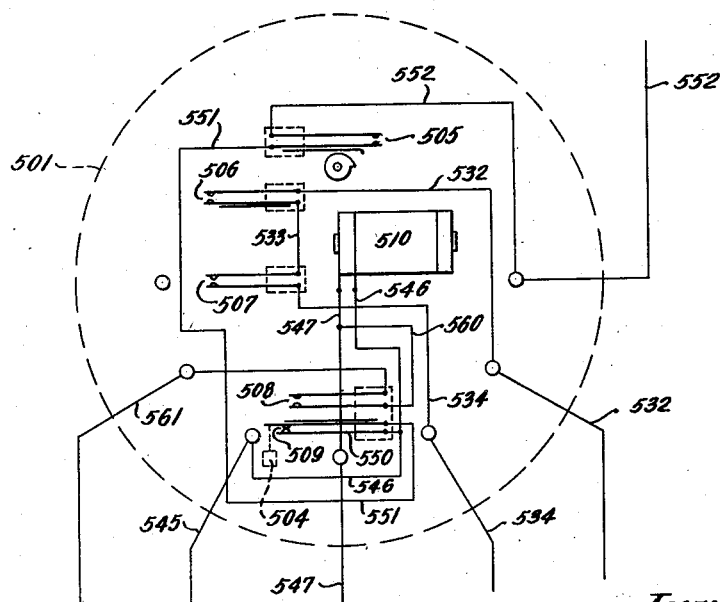
Fig. 31 is a wiring diagram thereof illustrating the elements and the circuits therein.

At each loading station is provided a dial 500 (see Figs. 30 and 31) each dial being connected by electric circuits to the timer brush block 473 on the post 472 assigned to the station at which the dial is located. Each dial is of the conventional type comprising a housing 501, a rotatable face disk 502, provided with a limit stop arm 503, a corrector button 504, and a plurality of equally spaced openings. The openings in the disk correspond to the unloading stations and are so marked as indicated on Fig. 30. Within the housing 501 are suitably mounted, as indicated in the wiring diagram of Fig. 31, normally separated impulse contacts 505, normally separated off-normal contacts 506, a normally open dial protector switch 507, a normally open corrector switch 508, a normally closed release switch 509 and a dial release solenoid 510. The dial is to be set to determine the unloading station to which a load sent from the loading station is to be delivered. Setting the dial is performed in the usual manner, by inserting the finger or an instrument in an opening and rotating the disk. The off-normal contacts 506 are closed thereby and the disk is held by suitable means (not shown) in the set position until released by the energizing of the release solenoid 510. When released the disk returns to its normal position and during its travel creates impulses by closing and opening the impulse contacts 505. As will be pointed out below, the dial controls the operation of the car-selecting means and in addition the operation of certain mechanism at its loading station.

Figure 32:
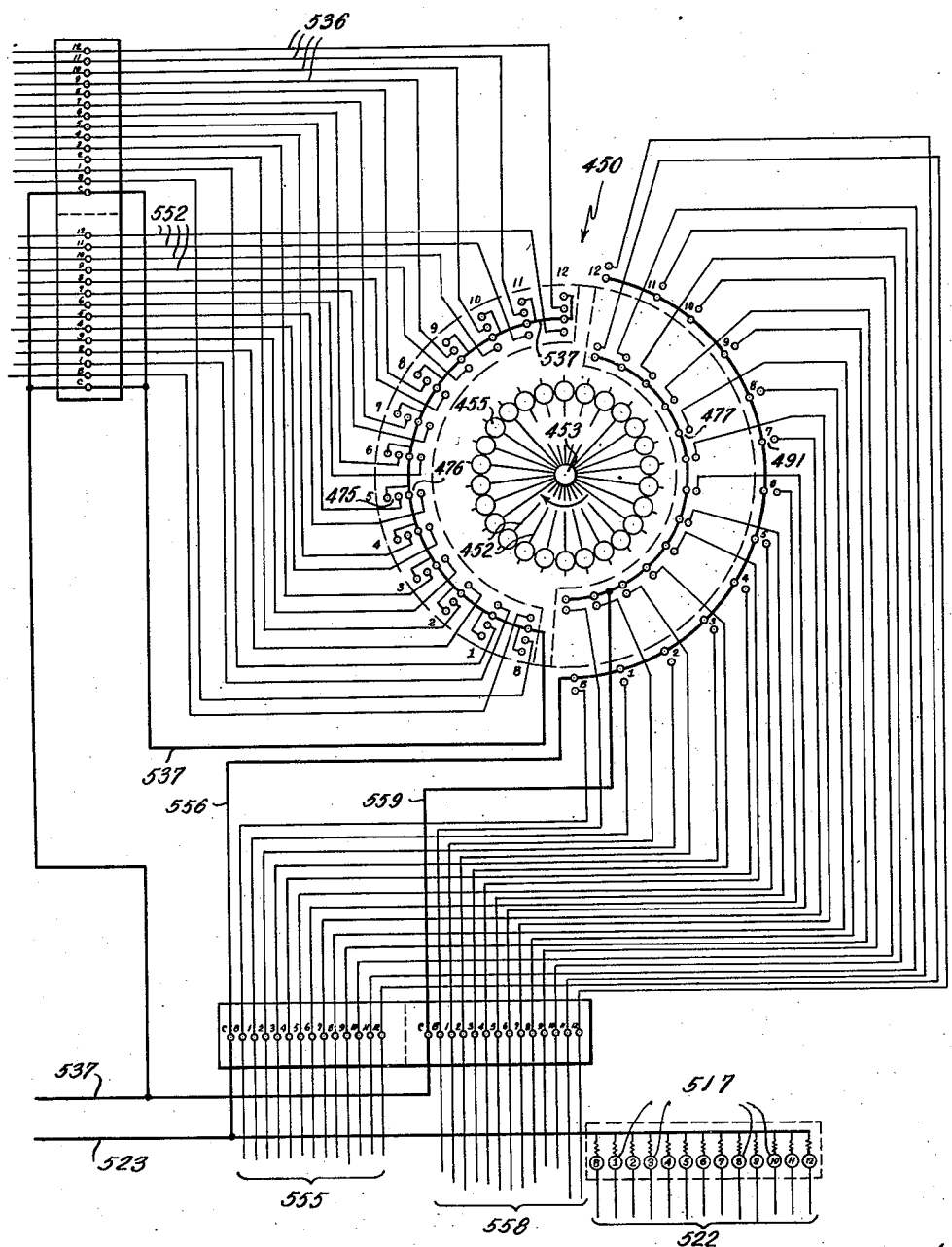
Figs. 32, 33 and 34 are schematic wiring diagrams of the circuits at the selecting mechanism, the loading stations and the unloading stations, respectively.

Adjacent each station switch 427 and preferably in the same panel therewith is a signal switch 515 (see Fig. 33), so associated, mechanically or otherwise, with the station switch 427, that when either switch is closed the other switch is opened. Controlled by each switch 515 is a signal bulb 516 at the floor, also shown on the same panel, and a second signal bulb 517 at a master panel (see Fig. 32). When the switch 515 is closed the bulbs are lighted by the completion of two circuits between the control leads 433, 438, to wit; leads 518, 519, switch 515, lead 520, bulb 516 and lead 521 (see Fig. 33) and leads 518, 519, switch 515, leads 520, 22, bulb 17 and lead 23. It will be noted that these bulbs are extinguished when the conveyer is in operation, since the closing of the station switches 427, which is essential to operating the conveyer, obviously means that the signal switches are opened. The failure to close any station switch will be indicated by the lighting of the station bulb 16 and of the panel bulb 517 controlled by the associated signal switch.

The operation of the conveyer will be described first generally and then in detail. It will be understood that the various motor and generator circuits shown in Fig. 24 have been closed and that the conveyer and timer are in motion. This operation comprises both mechanical and electrical instrumentalities and in the general description Fig. 35 will be found to contain all the information necessary to understand the electrical instrumentalities.

It may be assumed that an operator at a loading station desires to send a load to a certain unloading station. The load is placed on the loading station shelf 102 thus closing the switch 155 and the dial 500 is set for the particular unloading station. The off-normal contacts 506 are closed by setting the dial. The selector plate 455 in the timer, assigned to an empty car, first reaching the post 472 assigned to the loading station completes a circuit through the dial to energize the relay 535 thus completing a circuit by which the solenoid 154 is energized to release the cam bar 125.

The empty car selected by the timer acts on the released cam bar to advance the shelf with its load into the well. This movement of the shelf closes the dial release switch 156 to release the set dial and through the impulse contacts 505, closed and opened by the dial, sets the selector plate 455 through the impulse circuit for the selected unloading station. The solenoid 154 has meanwhile been deenergized by the movement of the selector plate 455, the load is removed from the shelf by the car and the car as it leaves the station raises the cam bar 125 to its inoperative position at which it is locked, and the shelf is now withdrawn out of the well to its normal position of rest.

As the loaded car approaches the selected unloading station the selector plate 455 through the bar 457 trips the arm 492 at the post 472 assigned to that unloading station and energizes the solenoid 254. The cam bar 225 is thereby released and the car acts upon the released cam bar to advance the shelf 202 into the well. The advancing shelf 202 closes the selector release switch 256 to restore the selector plate to its normal condition and removes the load from the car. The car then returns the cam bar 225 to its inoperative position at which it is locked and the shelf with its load is withdrawn from the well.

From the above it will be apparent that the loading is performed in five stages. These stages will now be set forth in detail.

*First stage.*—The closure of the switch 155 and the off-normal contacts 506 complete the following circuit.

From lead 413 through leads 530, 531, switch 155, lead 532, off-normal contact 506, lead 533, dial protector switch 507, lead 534, relay 535, and lead 536 to the brushes 475 of the brush block 473 on the timer post 472 assigned to that loading station. The circuit remains open until the arrival at that brush block of the first selector plate 455 assigned to an empty car i. e. a plate on which the contact bar 457 is in the inoperative position, and the switch 470 is closed. The open circuit just described is then completed from one brush 475 through the blade 480 in contact therewith, lead 483, switch 470, lead 484, second blade 480, second brush 475, and lead 537 to lead 414. The completion of this selector circuit energizes the relay 535 at the loading station.

*Second stage.*—The energizing of the relay 535 causes the switch 540 to complete a cam release circuit from lead 433 through lead 541, solenoid 154, lead 542, switch 540 and lead 543 to lead 438.

*Third stage.*—The cam bar 125 at the loading station is released by the energization of the solenoid 154 and the next approaching car, which is that to which the above-mentioned timer plate 55 is assigned, acts upon the cam bar to cause the lever 120 to advance the shelf 102 with the load thereon into the well 20. As soon as the lever 120 moves from its normal inoperative position the switch 157 is opened and the dial release switch 156 is closed.

*Fourth stage.*—The closing of switch 156 completes a circuit from the power lead 413 through leads 530, 545, 546, dial release solenoid 510, lead 547, switch 156 and lead 548 to the power lead 414. The solenoid 510 thereupon releases the dial and the impulse contacts 505 are closed and opened the number of times for which the dial has been set. Each closure of the contacts 505 imparts a pulsation to the time over an impulse circuit beginning at lead 546 through lead 550, dial release switch 509, lead 551, impulse contacts 505, lead 552, one of the brushes 476, the blade 481 in contact therewith, lead 485, impulse solenoid 463, lead 486, other blade 481, other brush 476 and lead 537 to the power lead 414. The impulse solenoid 463 causes the pawl 460 to act through the gear 456 to advance the contact bar 457 the necessary number of steps so that its tip will trip the arm 492 and close the switch 491 on the post 472 assigned to the selected unloading station to which the load in question is destined.

*Fifth stage.*—As soon as the plate 455 of the timer which permitted the completion of the first stage leaves the brush block 473 assigned to this loading station, the circuit completed thereby is broken and the relay 535 is deenergized. Thereupon the solenoid 154 of the second stage is deenergized. The car as it leaves the station with its load raises the cam bar 125 until it is locked by the bar 149 and the link 136 is released and causes the lever 120 to return the shelf 102 to its normal position out of the well. The lever 120 thereupon opens the switch 156 which breaks the circuit of the fourth stage.

Thus the various circuits concerned with the loading operation are now restored to their normal open condition, the loading station elements are in their inoperative positions, the car with its load is in transit to the predetermined unloading station and the time plate assigned to that car is in transit to the timer brush plate assigned to that unloading station.

The unloading operation comprises four stages which are initiated seriatim and will be so described. The circuits discussed will be found in Figs. 24, 32 and 34. The timer operates at such speed that the selector plate assigned to the loaded car reaches the timer post assigned to the predetermined unloading station just before the loaded car arrives at that station, i. e. if the predetermined unloading station is other than the one on the top floor (in this embodiment the twelfth floor), after the loaded car has passed the next preceding station.

*First stage.*—The bar 457 trips the arm 492 at such post and closes the switch 491 thereby completing a cam release circuit from the control lead 433 through lead 553 at the selected unloading station, normally closed switch 219, lead 554, solenoid 254, lead 555, switch 491, and leads 556, 528 to the control lead 438.

*Second stage.*—The energizing of the solenoid 254 releases the cam bar 225 at that station and through the mechanical connections previously described causes the lever 220 to advance the shelf 202 into the wall 20 to receive the load from the approaching car.

*Third stage.*—As soon as the lever 220 starts its movement away from the inoperative position the selector release switch 256 is closed and simultaneously the blades 482 on the timer plate contact with the brushes 477 on the considered post. The closure of the switch 256 and the contact of the blades 482 and brushes 477 completes a selector release circuit from the power lead 413 through lead 557, switch 256, lead 558, one of the brushes 477, one of the blades 482, lead 487, release solenoid 469, lead 488, other blade 482, other brush 477 and leads 559, 537 to the power lead 414 and the contact bar 457 is permitted by the solenoid 465 to resume its normal inoperative position.

*Fourth stage.*—The circuit of the first stage by which the solenoid 254 was energized is now broken so that when the cam bar 225 is lowered by the car to its final position it will be securely held therein by the bar 249 and the shelf 202 is returned with its load to the normal inoperative position and delivers the load to the roller conveyer 300 which advances it to the lowerator 305 as previously described. The unloading station is now restored to its normal inoperative position and the timer elements affected by the loading operation have now resumed their normal inoperative positions.

From the above description it will be noted that the presence of a load upon the shelf 102 is essential since otherwise the operation of the dial 500 would be of no avail. Should the disk be shifted when no load is upon the shelf, it may be restored to its normal position by depressing the corrector button 504 whereby the dial release switch 509 is opened and the corrector switch 508 is closed. The closing of the switch 508 completes a circuit from the power lead 413 through leads 530, 545, 546, dial release solenoid 510, leads 547, 560, switch 508 and lead 561 to the power lead 414, which releases the disk and allows it to resume its normal position.

It will further be noted that the timer 450 not only controls the destination of the load on a car, but also selects the first approaching car free to receive the load at the loading station. The operations of the dial and of the loading elements can not take place until the timer selector plate 455 assigned to an empty car has reached the brush block assigned to the station at which the load is to be despatched.

While the movement of only one load has been described it will be understood that the various stations operate independently so that loads from any desired number of loading stations may be despatched simultaneously to any or all the unloading stations. The stations are operated with such speed that the shelves moved into the well to cooperate with a car are retracted before the succeeding car arrives. In case of any possible interference with the shelves the following safety feature is provided which will stop the operation of the conveyer. As pointed out above, the switches 157, 162 and 257, 262 are arranged in parallel. The switches 157 and 257 are opened when the shelves 102 and 202 associated therewith are out of the normal inoperative position and the switches 162 and 262 are tripped and opened by each car as it passes. Under normal conditions no disturbance with the motor circuit will result due to the arrangement of the switches in parallel. If, however, a switch 162 or 262 be opened when the corresponding switch 157 or 257 is open due to the fact that the associated shelf 102 or 202 is not in the inoperative position, the secondary circuit will be broken whereupon the relay 426 will be deenergized and the switch 425 will open the motor circuit.

Other safety features comprise the switches 428, one adjacent each loading station and the switch 429 adjacent the foot sprocket. The switches 428 have previously been referred to as lintel switches and may be located at the various fire doors (not shown) so that they are tripped if the doors are closed automatically and stop the motor by breaking the motor circuit. Such switches may, however, be mounted in the well, as shown in Figs. 24 and 33 so that they will be tripped by any load not fully positioned on a car. The tripping of any switch 428 will light the bulbs 516 and 517 associated therewith by by-passing the open switch 515 through lead 518, switch 428 and lead 524 (see Fig. 33). The switch 429 normally held closed by the stud 39 on the reciprocal base 31 will open if for any reason the motor is not stopped by any of the previously mentioned safety switches. Should the platform of an unloading station remain in the well and the motor continue to drive the conveyer, a car would be stopped thereby and the chain shortened, thus raising the foot sprocket 23 and its base sufficiently to disengage the stud 39 with the switch arm so that the switch 429 is opened and the circuit broken.

While one embodiment of the invention has been shown and described, it will be understood that it is not limited thereto and that changes in the elements thereof or other embodiments may be made without departing from the spirit and scope of the invention as set forth in the following claims.

I claim:

1. A conveyer system comprising an endless conveyer chain, driving means therefor, a plurality of load-transporting cars on said conveyer chain which travel in a predetermined path, a plurality of loading and unloading stations adjacent said path, and a timer electrically controlled by an operator at a loading station at which a load is ready, which timer acts to cause the first empty car, approaching that station after the actuation of said timer, to remove the load from that station and deliver it to any unloading station definitely selected by the operator.

2. A conveyer system comprising an endless conveyer chain, driving means therefor, a plurality of load-transporating cars on said conveyer chain which travel in a predetermined path, a plurality of loading and unloading stations adjacent said path, a timer and electric wiring connecting said timer with each of said stations, and means by which an operator at a loading station at which a load is ready selects the unloading station to which that load is to be delivered, said means actuating said timer which acts to cause the first empty car, approaching that station after the timer has been actuated, to remove the load from that station and deliver it to any unloading station definitely selected by the operator.

3. A conveyer system comprising an endless conveyer chain, driving means therefor, a plurality of load-transporting cars on said conveyer chain which travel in a predetermined path, a plurality of loading and unloading stations adjacent said path, a timer, electric wiring connecting said timer with each of said stations, a dial at each loading station and electric wiring connecting the timer with each dial, said timer being actuated by the movement of the dial at the loading station at which a load is ready to cause the first empty car approaching that station after the dial has been moved, to remove the load from that station and to deliver it to the unloading station selected by the movement of the dial.

4. In a conveyer system including an endless conveyer chain, driving means therefor and a plurality of cars on said conveyer chain which travel in a predetermined path, a station adjacent to and at one side of said path, said station including a shelf which is movable into and out of the path of travel of the cars, and means for moving said shelf, such means including a cam bar at the other side of the path of travel, a connection between said bar and said shelf, said bar being normally in an inoperative position, and means acting upon the approach of a selected car to the station to cause the bar to move into an operative position in which it is engaged by the selected car to move the shelf, through the connection, into the path of travel of such car.

5. In a conveyer system including an endless conveyer chain, driving means therefor and a plurality of cars on said conveyer chain which travel in a predetermined path, a station adjacent to and at one side of said path, said station including a shelf which is movable into and out of the path of travel of the cars, and means for moving said shelf, such means including a cam bar at the other side of the path of travel, a connection between said bar and said shelf, said bar being normally in an inoperative position, and means acting upon the approach of a selected car to the station to cause the bar to move into an operative position in which it is engaged by the selected car and returned to the inoperative position and acting through said connection to move the shelf into the path of travel of the cars, and means operative when the bar resumes its inoperative position to cause the connection to move the shelf out of such path of travel.

6. In a conveyer system including an endless conveyer chain, driving means therefor, and a plurality of load-transporting cars on said conveyer chain which travel in a predetermined path, a loading station adjacent to and at one side of said path, said station including a shelf which is horizontally movable into and out of the path of travel of the cars, and means at the other side of said path, positive connections between said means and said shelf for moving the latter, said means being tripped by the first empty car approaching the station after a load is ready on the shelf and acting through said positive connections to advance the shelf and load into the path of travel whereupon the load on the shelf is removed by said car.

7. In a conveyer system including an endless conveyer chain, driving means therefor, and a plurality of load-transporting cars on said conveyer chain which travel in a predetermined path, a loading station adjacent to and at one said of said path, said station including a shelf which is movable into and out of the path of travel of the cars, a cam bar at the other side of said path, and connections between said bar and said shelf, said cam bar being normally in an inoperative position, and means actuated by an operator when a load is ready on the shelf for causing said cam bar to take an operative position wherein the first empty car approaching the station after said means is actuated, engages said bar to return it to its normal inoperative position and through said connections, to advance the shelf and load into the path of travel whereupon the load on the shelf is removed by said car.

8. In a conveyer system including an endless conveyer chain, driving means therefor, and a plurality of load-transporting cars on said conveyer chain which travel in a predetermined path, a loading station adjacent to and at one side of said path, said station including a shelf which is movable into and out of the path of travel of the cars, means on said shelf tripped by a load placed thereon, a cam bar at the other side of said path, and connections between said bar and said shelf, said cam bar being normally in an inoperative position, and means actuated by an operator selecting the first empty car to approach the station after a load is ready on the shelf having tripped such first named means for causing said cam bar to take an operative position upon the approach of such car whereupon that car engages said bar to move it out of such operative position and through said connections to advance the shelf and load into the path of travel whereupon the load on the shelf is removed by said car, and the cam bar is returned by said car to its normal inoperative position.

9. In a conveyer system including an endless conveyer chain, driving means therefor and a plurality of load-transporting cars on said conveyer chain which travel in a predetermined path, an unloading station adjacent to and at one side of said path, said station including a shelf which is movale into and out of the path of travel of the cars, means at the other side of the path, connections between such means and said shelf for moving the shelf into the path, said means being normally held in an inoperative position and being released therefrom automatically upon the approach of a car having thereon a load destined to be delivered to that station, and caused to assume the operative position, and means carried by said car for engaging such means and returning it to the inoperative position, whereby the shelf is advanced into the path of travel of the car and removes the load therefrom.

10. In a conveyer system including an endless conveyer chain, driving means therefor and a plurality of load-transporting cars on said conveyer chain which travel in a predetermined path, an unloading station adjacent to and at one side of said path, said station including a shelf which is movable into and out of the path of travel of the cars, means at the other side of the path, connections between such means and said shelf for moving the shelf into the path, said means being normally held in an inoperative position and being released therefrom automatically upon the approach of a car having thereon a load destined to be delivered to that station, and caused to assume the operative position, means carried by said car for engaging such means and returning it to the inoperative position, whereby the connections advance the shelf into the path of travel of the car, and means acting upon said connections when the first named means resumes its normal inoperative position to allow the shelf to move out of such path.

11. In a conveyer or system including an endless conveyer chain, driving means therefor and a plurality of load-transporting cars on said conveyer chain which travel in a predetermined path, an unloading station adjacent to and at one side of said path, said station including a shelf which is movable into and out of the path of travel of the cars, a cam bar at the other side of said path, connections between said bar and said shelf for moving the shelf into the path, said cam bar being normally held in an inoperative position and being released therefrom automatically upon the approach of a car having thereon a load destined to that station and caused to assume the operative position in the path of travel of the cars, and a roller carried by said car for engaging said bar and returning it to its inoperative position whereby the connections advance the shelf into the path of travel.

12. In a conveyer system including an endless conveyer chain, driving means therefor and a plurality of load-transporting cars on said conveyer chain which travel in a predetermined path, an unloading station adjacent to and at one side of said path, said station including a shelf which is movable into and out of the path of travel of the cars, a cam bar at the other side of said path, connections between said bar and said shelf for moving the shelf into the path, said cam bar being normally held in an inoperative position and being released therefrom automatically upon the approach of a car having thereon a load destined to that station and caused to assume the operative position in the path of travel of the cars, a roller carried by said car for engaging said bar and returning it to its inoperative position whereby the connections advance the shelf into the path of travel, and a stud engaged by said connections when the bar resumes its normal inoperative position to allow the shelf to move back out of the path.

13. In a conveyer system including an endless conveyer chain, driving means therefor and a plurality of load-transporting cars on said conveyer chain which travel in a predetermined path, an unloading station adjacent to said path, said station including a shelf which is movable into and out of the path of travel of the cars, means for moving said shelf, said shelf when in the path of travel of the cars receiving a load therefrom, a roller conveyer at the station inclined downwardly from the path to which the load is fed by the shelf and by which the load is removed from the station, a plurality of sets of fingers successively tripped by the load, electric switches each actuated by a set of said fingers, and a connection between said switches and said driving means whereby the simultaneous tripping of said switches stops said driving means.

14. In a conveyer system comprising a plurality of load-transporting cars, and a plurality of loading and unloading stations, the loads being fed to the cars at the loading stations and delivered by the cars at the unloading stations, means for selecting the car to receive a load at a loading station and for predetermining the unloading station to which the load is to be delivered, such means comprising a single timer unit directly connected by electric circuits to each loading and unloading station, and a selector dial at each loading station which may be set by an operator, when a load is ready, to cause the timer unit to select the car to receive such load and to deliver it at the desired unloading station.

15. In a conveyer system comprising a plurality of load-transporting cars, and a plurality of loading and unloading stations, the loads being fed to the cars at the loading stations and delivered by the cars at the unloading stations, means for selecting the car to receive a load at a loading station and for predetermining the unloading station to which the load is to be delivered, such means comprising a single timer unit directly connected by electric circuits to each loading and unloading station, and a selector dial at each loading station which may be set by an operator, when a load is ready, to cause the timer unit to select the car to receive such load and to deliver it at the desired unloading station, said electric circuits being normally open and said dial remaining in the set position until electric circuits with the timer unit are completed and then returning to its normal inoperative position, and during such return imparting impulses to the timer unit which set it for the completion of a circuit to the desired unloading station as the selected car approaches such station.

16. In a conveyer system comprising a plurality of load-transporting cars, and a plurality of loading and unloading stations, the loads being fed to the cars at the loading stations and delivered by the cars at the unloading stations, means for selecting the car to receive a load at a loading station and for predetermining the unloading station to which the load is to be delivered, such means comprising a single timer unit directly connected by electric circuits to each loading and unloading station, and a selector dial at each loading station which may be set by an operator, when a load is ready, to cause the timer unit to select the car to receive such load and to deliver it at the desired unloading station, said circuits being normally open and said dial remaining in the set position until two circuits with the timer unit are completed, and then returning to its normal inoperative position, and during such return breaking one of said circuits and imparting impulses to the timer unit over the other circuit, which impulses set the timer unit for the completion of the circuit to the desired unloading station as the selected car approaches such station.

17. In a conveyer system comprising a plurality of load-transporting cars, and a plurality of loading and unloading stations, the loads being fed to the cars at the loading stations and delivered by the cars at the unloading stations, means for selecting the car to receive a load at a loading station and for predetermining the unloading station to which the load is to be delivered, such means comprising a single timer unit directly connected by electric circuits to each loading and unloading station, and a selector dial at each loading station which may be set by an operator, when a load is ready, to cause the timer unit to select the car to receive such load and to deliver it at the desired unloading station, said timer unit including a plurality of spaced posts one assigned to each station and each post supporting a brush block and a plurality of arms one assigned to each car, the electrical circuits from the timer to the stations including such brush blocks and being normally open, and said dial acting when set to complete the circuits from the brush block on the post assigned to the station.

18. In a conveyer system comprising a plurality of load-transporting cars, and a plurality of loading and unloading stations, the loads being fed to the cars at the loading stations and delivered by the cars at the unloading stations, means for selecting the car to receive a load at a loading station and for predetermining the unloading station to which the load is to be delivered, such means comprising a single timer unit directly connected by electric circuits to each loading and unloading station, and a selector dial at each loading station which may be set by an operator, when a load is ready, to cause the timer unit to select the car to receive such load and to deliver it at the desired unloading station, said timer unit including a plurality of stationary spaced posts, one assigned to each station and a brush block supported on each post, a plurality of arms, one assigned to each car, and a selector plate supported by each arm, a shaft on which said arms are radially supported, and means for rotating said shaft to move said plates adjacent each of said posts.

JOHN CAESAR.